(12) United States Patent
Guday et al.

(10) Patent No.: US 10,362,485 B2
(45) Date of Patent: Jul. 23, 2019

(54) DELEGATED PROFILE AND POLICY MANAGEMENT

(71) Applicant: Microsoft Technology Licensing, LLC, Redmond, WA (US)

(72) Inventors: Shai Guday, Redmond, WA (US); John David Bruner, Bellevue, WA (US); Calvin C. Choe, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/909,827

(22) Filed: Mar. 1, 2018

(65) Prior Publication Data

US 2018/0206123 A1    Jul. 19, 2018

Related U.S. Application Data

(62) Division of application No. 14/997,430, filed on Jan. 15, 2016, now Pat. No. 9,955,353.

(Continued)

(51) Int. Cl.
*H04W 4/50*        (2018.01)
*H04W 8/18*        (2009.01)
(Continued)

(52) U.S. Cl.
CPC .......... *H04W 12/08* (2013.01); *H04L 63/102* (2013.01); *H04L 67/303* (2013.01); *H04W 4/50* (2018.02); *H04W 8/18* (2013.01); *H04W 8/205* (2013.01); *H04W 8/245* (2013.01); *H04W 12/04* (2013.01); *H04W 48/16* (2013.01)

(58) Field of Classification Search
CPC .... H04L 63/102; H04L 67/303; H04W 12/04; H04W 12/08; H04W 48/16; H04W 4/001; H04W 8/18; H04W 8/205; H04W 8/245
See application file for complete search history.

(56) References Cited

U.S. PATENT DOCUMENTS

2004/0221163 A1   11/2004  Jorgensen et al.
2009/0205028 A1    8/2009  Smeets et al.
(Continued)

FOREIGN PATENT DOCUMENTS

WO       2012058446 A1     5/2012

OTHER PUBLICATIONS

"Final Office Action Issued in U.S. Appl. No. 14/997,395", dated Dec. 28, 2017, 16 Pages.

(Continued)

*Primary Examiner* — Kashif Siddiqui

(57) ABSTRACT

Identities of mobile communications devices and subscription credentials are maintained by an enterprise server. The subscription credentials are operative to enable access to subscription services of a mobile network operator. Control of the subscription credentials is delegated from the mobile network operator to the enterprise server. The enterprise server determines which of the mobile communications devices are to be provisioned by the subscription credentials. Policies for use of the subscription credentials by the determined mobile communications devices are identified. The subscription credentials and policies are applied to the mobile communications devices.

20 Claims, 14 Drawing Sheets

Related U.S. Application Data

(60) Provisional application No. 62/205,457, filed on Aug. 14, 2015.

(51) Int. Cl.

| | | |
|---|---|---|
| *H04W 8/20* | (2009.01) | |
| *H04W 8/24* | (2009.01) | |
| *H04L 29/06* | (2006.01) | |
| *H04L 29/08* | (2006.01) | |
| *H04W 12/04* | (2009.01) | |
| *H04W 12/08* | (2009.01) | |
| *H04W 48/16* | (2009.01) | |

(56) References Cited

U.S. PATENT DOCUMENTS

| | | |
|---|---|---|
| 2010/0131755 A1 | 5/2010 | Zhu et al. |
| 2012/0108204 A1 | 5/2012 | Schell et al. |
| 2014/0032691 A1* | 1/2014 | Barton ............... H04L 41/00 709/206 |
| 2014/0162622 A1 | 6/2014 | Oda et al. |
| 2014/0219447 A1 | 8/2014 | Park et al. |
| 2014/0287725 A1 | 9/2014 | Lee |
| 2015/0121495 A1 | 4/2015 | Gao et al. |
| 2015/0163056 A1 | 6/2015 | Nix |
| 2016/0226705 A1* | 8/2016 | Toner ............... H04L 67/26 |
| 2017/0033823 A1 | 2/2017 | Smith et al. |
| 2017/0041296 A1* | 2/2017 | Ford ............... H04L 63/0421 |
| 2017/0048251 A1 | 2/2017 | Guday et al. |

OTHER PUBLICATIONS

"Non-Final Office Action Issued in U.S. Appl. No. 14/997,395", dated Jul. 25, 2018, 16 Pages.

"Non-Final Office Action Issued in U.S. Appl. No. 14/997,395", dated Aug. 11, 2017, 16 Pages.

"Non-Final Office Action Issued in U.S. Appl. No. 14/997,430", dated Aug. 17, 2017, 9 Pages.

"International Preliminary Report on Patentability Issued in PCT Application No. PCT/US2016/045088", dated Oct. 20, 2017, 9 Pages.

"International Search Report and Written Opinion Issued in PCT Application No. PCT/US2016/045088", dated Oct. 5, 2016, 13 Pages.

"Second Written Opinion Issued in PCT Application No. PCT/US2016/045088", dated Jul. 10, 2017, 9 Pages.

\* cited by examiner

DELEGATED PROFILE AND POLICY MANAGEMENT

CROSS REFERENCE TO RELATED APPLICATIONS

This application is a divisional patent application of application with Ser. No. 14/997,430, filed Jan. 15, 2016, entitled "DELEGATED PROFILE AND POLICY MANAGEMENT", which is now allowed, and claims benefit under 35 U.S.C. § 119(e) of Provisional U.S. patent application No. 62/205,457, filed Aug. 14, 2015. The aforementioned application(s) are hereby incorporated herein by reference.

TECHNICAL FIELD

This disclosure relates generally to management of credentials for communications devices such as wireless-enabled tablets, PCs, smartphones, smart watches, and other stationary and portable connected devices.

BACKGROUND

Service providers to communications devices generally require that the communications device have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or internet data service.

The credentials may reside in a secure container called a Universal Integrated Circuit Card (UICC) or "SIM card." The UICC may be embedded in the communications device, in which case it may be called an embedded UICC (eUICC). The credentials may be provisioned to the UICC or eUICC when manufactured or may be provisioned to the UICC or eUICC remotely while the UICC or eUICC resides in the communications device.

SUMMARY

Illustrative examples of the present disclosure include, without limitation, methods, systems, and various devices. In one aspect, identities of mobile communications devices and subscription credentials are maintained by an enterprise. The subscription credentials are operative to enable access to subscription services of a mobile network operator. Control of the subscription credentials are delegated from the mobile network operator to the enterprise. The enterprise determines which of the mobile communications devices are to be provisioned by the subscription credentials. Policies for use of the subscription credentials by the determined mobile communications devices are identified. The subscription credentials and policies are applied to the mobile communications devices.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Figure 1:
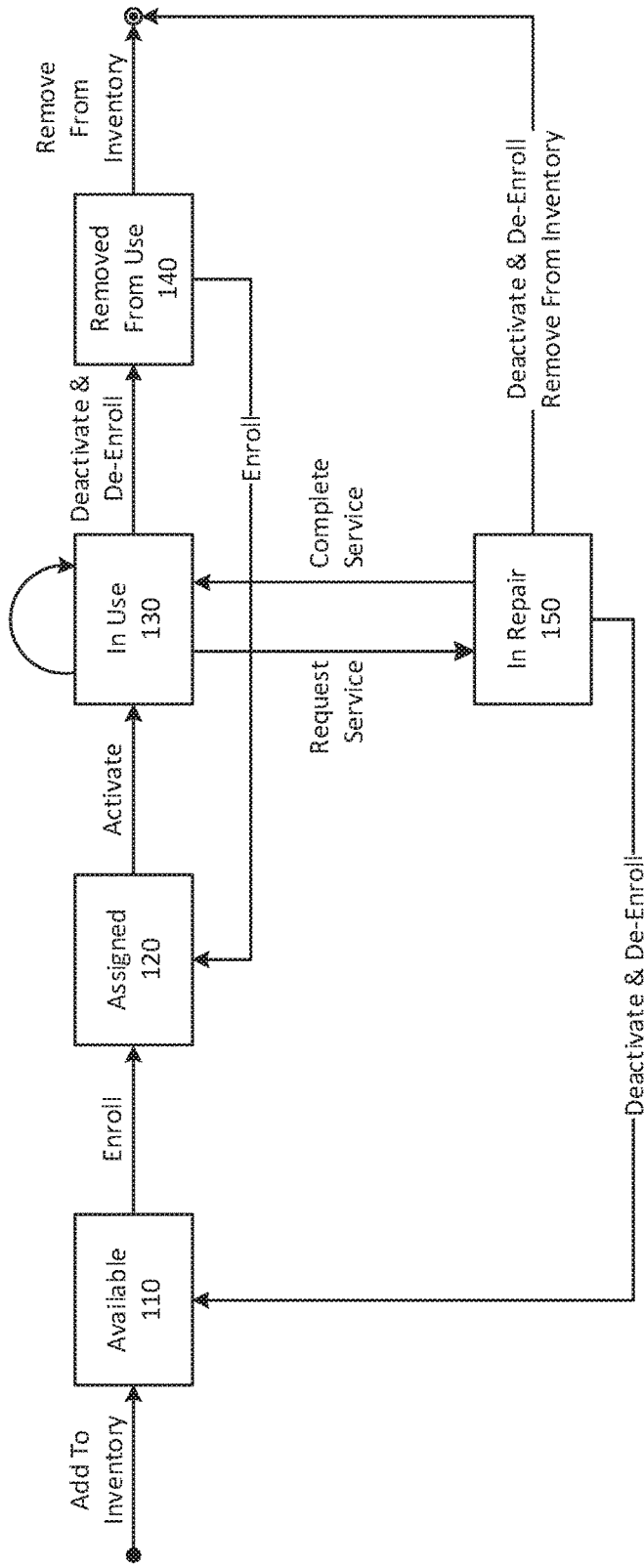
FIG. 1 depicts an example of an enterprise management lifecycle of an enterprise device.

An enterprise, such as a company or institution, may provide communications devices to its employees or other users. The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include UICCs or eUICCs), and the like. A UICC or eUICC may be included in the communications device to ensure the integrity and security of personal data and enables communications with mobile communications providers or to access the enterprise's internal networks. The enterprise may also allow employees to use their own devices, in which case the enterprise may implement mechanisms to allow for secured access to their internal networks. Users of their own devices may also provide for access to their own personal mobile communications providers.

In one example, the enterprise can provide communication services to its employees or others by contracting with mobile network operators (MNOs) to obtain a fleet of UICC's (SIM cards) that the enterprise can distribute and reuse as needed. The enterprise can engage a MNO for a specified number of subscription service accounts, for which the MNO provides a corresponding number of SIM cards. These SIM cards can then be shared amongst any number of employees by inserting the SIM cards into the employee's communications devices, allowing the enterprise to provide or manage the communication services to the employees. In this way, the enterprise can control usage of its subscription service accounts. By later removing the SIM card, employees will no longer be able to access the enterprise's subscription service accounts, and the SIM cards can be assigned to other employees as needed by the enterprise without the need to change subscription contracts or otherwise engaging the service provider. The physical separation of service-enabling credentials from the communications device itself can provide flexibility and control to the enterprise.

In another example, the enterprise may also utilize the eUICC which, unlike a SIM card, is typically not easily accessible or removable, and may be soldered or otherwise installed in a communications device. A eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. In some embodiments, a eUICC profile, as will be further described below in FIG. 5, may include a combination of file structure, data, and applications associated with the service credentials provisioned onto a credential device and which enable the communications device to use the subscription services associated with that profile.

FIG. 1 depicts an example of an enterprise management lifecycle of an enterprise device. An enterprise device may refer to any communications device that is managed by an enterprise. In FIG. 1, a communications device becomes available 110 to the enterprise when it is added to its inventory (for example, when the device is purchased or reactivated). When an enterprise device is assigned 120 to a member of the workforce, the enterprise device may be enrolled into a device management process. The enterprise device may either be an enterprise-owned device or may be a user's personal device. When the enterprise device is given to the employee or otherwise brought into service, the enterprise device may be activated. This activation may involve installation of physical assets (such as a UICC card) and/or installation of software, policies, and other configuration information. Examples of policies that may be installed may include device policies for the use of its subscriptions. For example, the enterprise may configure a particular access point network (APN) for enterprise data connectivity or restrict data roaming.

The enterprise may update its database to assign the subscription to a particular device and end user. The enterprise may reconcile billing records received from the MNO against the device assignment in order to track usage by its workforce and on its devices. While the enterprise device is in use 130, the enterprise can actively manage the device, updating its policies and configuration as well as obtaining audit records of its usage. When the enterprise device is returned from the end user, the enterprise device may be deactivated as a managed device, resulting in the removal of enterprise-owned physical or virtual assets and de-enrollment from the device management process. The enterprise may remove its device management policies from the device, updating its records to indicate that the device is no longer enrolled for device management and that its subscription is no longer allocated. The enterprise device may then be assigned to a new user and the enterprise may activate the reassigned profile on a new device. Otherwise, the device may be removed 140 from the inventory entirely.

An enterprise device that is in active use may develop a fault requiring repair 150. If the repair process is lengthy, then the device may be removed from service and the user provided with a different device. If the device can be repaired, the device may be returned to inventory for re-assignment. Otherwise, the enterprise device may be recycled.

Figure 2:
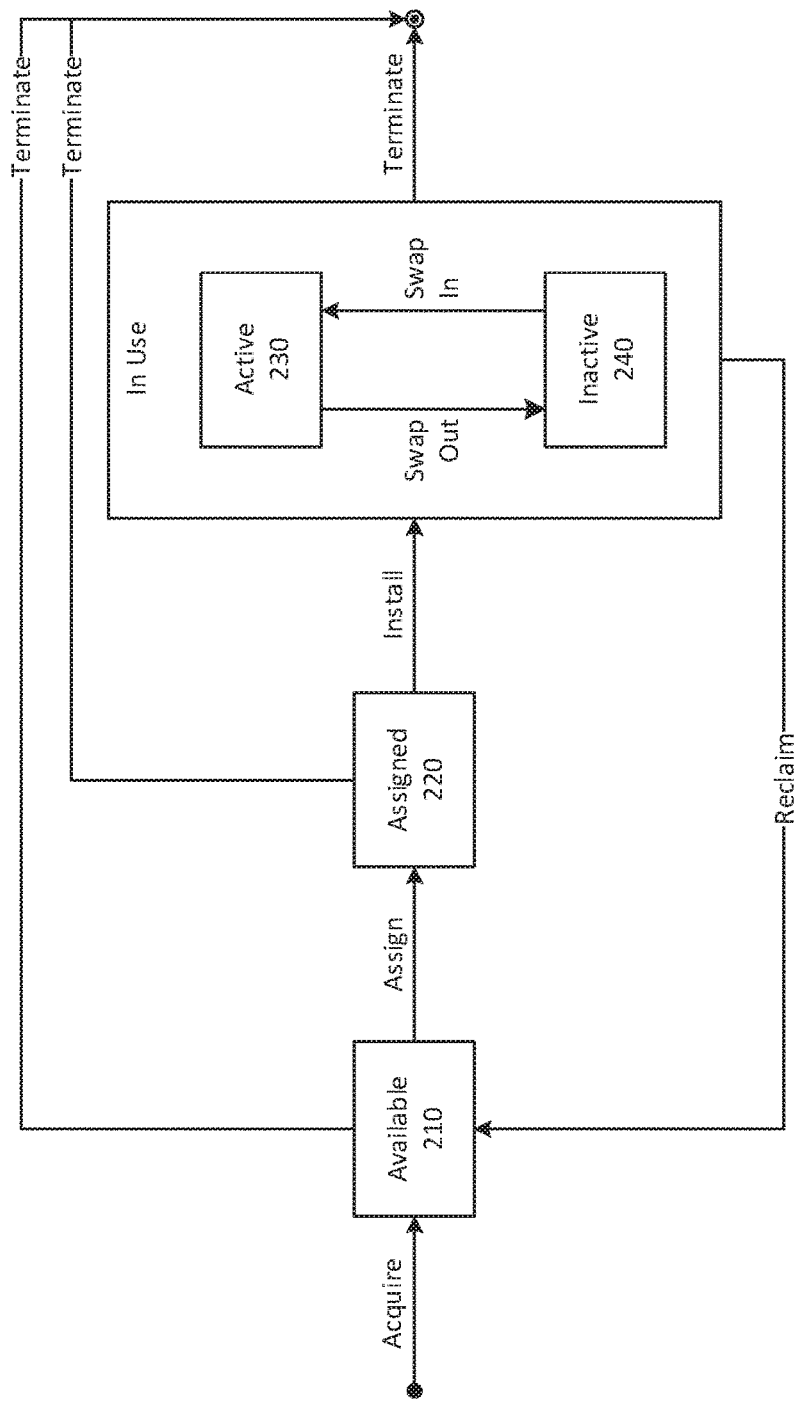
FIG. 2 depicts an example subscription lifecycle.

FIG. 2 depicts an example MNO subscription lifecycle. After an enterprise acquires a subscription from an MNO and the subscription is available 210, the enterprise may assign the subscription to an enterprise device. Once the subscription is assigned 220, credentials (e.g., a physical UICC card or an eUICC profile) may be installed in the enterprise device, after which the subscription may be set to active 230. The end user may deactivate the subscription (e.g., physically swap UICC cards or switch between eUICC profiles) after which the subscription may go into an inactive state 240. The end user may later activate the subscription (e.g., reinstall the UICC or reactivate the profile). The enterprise may reclaim the subscription, for example, by recovering the UICC from a device). The subscription may be terminated by the enterprise or mobile operator.

An enterprise may purchase and manage a number of subscriptions from the MNO. The enterprise may also acquire sets of subscriptions from multiple different MNOs. Whether the enterprise employs the UICC or the eUICC, the enterprise may wish to implement a greater degree of management control and authority of how the UICCs or eUICCs are distributed to the enterprise's employees, without directly working through the MNOs, which in some cases may require additional overhead and cost.

The present disclosure describes ways for an entity such as an enterprise to manage profiles or subscriptions to communications devices and manage policies associated with the profiles or subscriptions while maintaining security for the profiles.

In one embodiment, methods and systems are described for enterprise control over a fleet of subscription credentials. In some embodiments, control may be delegated from an MNO to the enterprise. Such control may include, in some examples, the ability for the enterprise to determine when and where subscription credentials are provisioned, activated, deactivated, and removed, for example as shown in FIGS. 1-2. Control delegated to the enterprise may also, in some embodiments, include associating subscription credentials with policies for use of the services associated with the subscriptions. Determination of where to provision credentials may include, for example, specification of which device is to be provisioned, such as a particular communications device that may belong to an enterprise employee. Provisioning of subscription credentials may include supplying a selected device with a copy of a profile that includes credentials for the subscription. Activation of a subscription may enable a selected provisioned profile among a plurality of provisioned profiles to access services associated with the activated subscription. Removal of a profile may include removal or deletion of the current state of a profile on a selected device so that the profile may be provisioned to another device.

Enterprise control over subscription credentials may be direct or indirect. In one embodiment, direct control over subscription credentials may include direct management by the enterprise of copies of subscription credentials. The enterprise may, for example, maintain encrypted electronic copies of a profile external to a eUICC even when the profile is not provisioned to a device (e.g., before the profile is provisioned or after the profile is removed). Indirect control over subscription credentials may include embodiments where only the MNO directly manages copies of profiles. In one embodiment, the MNO may expose an interface through which an enterprise can control the provisioning and activation of the credentials corresponding to the enterprise's subscriptions without exercising direct control over the credentials.

In addition to provisioning and activation, control of subscription credentials may further include associating a profile with policies for use of the subscription services. In some embodiments, such policies may be enforced by some combination of a eUICC application and a device agent that may reside in the communications device. For example, a eUICC application may be implemented as software that is included as part of a profile and runs on a processor in a provisioned eUICC. The device agent may execute on a processor outside of the eUICC, such as another processor in the communications device that contains the provisioned eUICC. The device agent and the eUICC application may be configured to cooperate to enforce the enterprise's subscription policies. Enterprise-specified policies may be enforced simultaneously with, or in conjunction with, MNO-specified policies for a particular profile. An enterprise-specified policy may specify, for example, activation of alternate provisioned profiles from different MNOs based on specified conditions and services.

Figure 3:
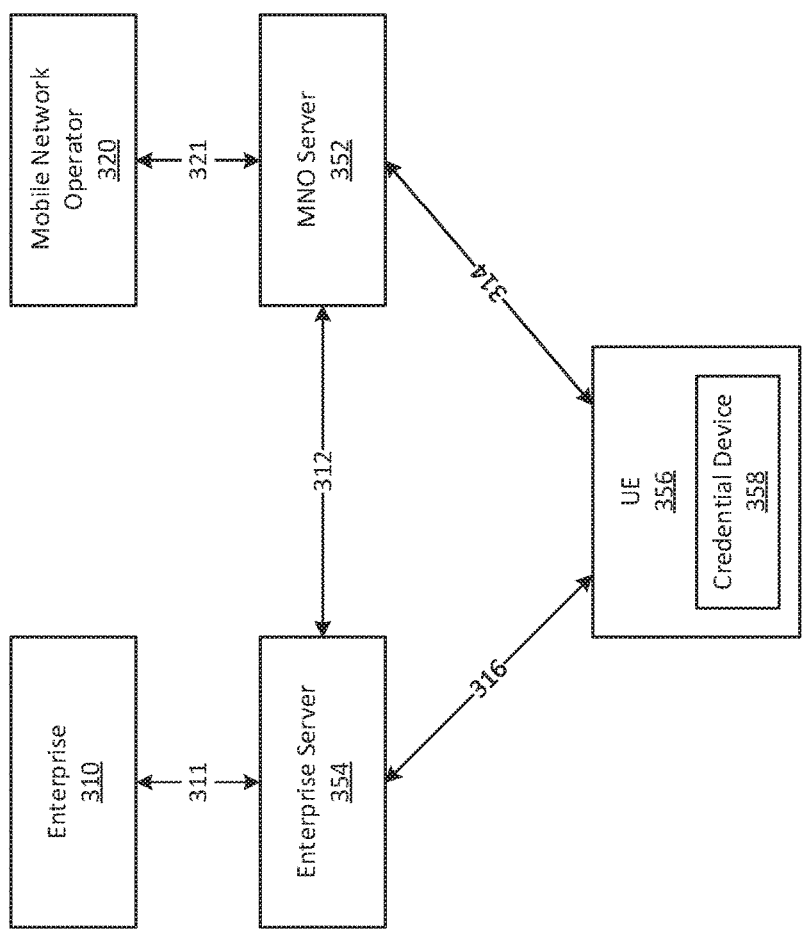
FIG. 3 depicts an example environment for provisioning of profiles.

FIG. 3 depicts an example environment for provisioning of profiles. A MNO 320 may own or otherwise control one or more MNO servers 352 through an interface 321, while an enterprise may own or otherwise control one or more enterprise servers 354 through an interface 311. User Equipment (UE) 356 may, for example, be a mobile communications device containing a credential device 358. The credential device 358 may refer to a physically removable device containing electronic credentials, such as a SIM card or removable eUICC, a non-removable device that can be electronically provisioned with subscription credentials, such as a soldered eUICC, or the like. The credential device 358 may also refer to a software container that can contain one or more e-profiles and that can be electronically provisioned with subscription credentials in accordance with some embodiments.

Once provisioned with credentials on a credential device 358, UE 356 may be configured to use the provisioned credentials to access MNO subscription services via network connection 314. Network connection 316 may allow enterprise servers 354 to place or otherwise determine policies for use of the provisioned credentials by UE 356. Network connection 314 may also enable UE 356 to access enterprise services or resources. Network connections 312, 314, and 316 may be any type of computer network connection, including wired, WiFi, a cellular data connection, and the like. For example, connection 316 may allow for a connection using a cellular data service provided by the MNO.

In embodiments where the subscription credentials are implemented in an electronic profile such as a eUICC profile, control of subscription credentials may directly or indirectly be delegated from the MNO 320 to enterprise 310. In one embodiment, direct control may include creation of credentials on MNO servers 352 and copying the credentials from MNO servers 352 to enterprise servers 354 over connection 312. Enterprise 310 may then choose when and where the credentials are to be provisioned. UE 356 may be provisioned by copying a selected profile from enterprise servers 354 to the credential device 358 of UE 356 via connection 316. Alternatively, UE 356 may be provisioned by copying a selected profile from enterprise servers 354 to the credential device 358 of UE 356 in conjunction with MNO servers 352, via connections 312 and 314. When MNO 320 or enterprise 310 chooses to remove the provisioned credentials, the provisional credentials may be removed from the credential device 358 and stored on enterprise servers 354 until another UE 356 is selected for provisioning.

In one embodiment, indirect control may include creation and storage of the subscription credentials on MNO servers 352. However, in the case of indirect control, a copy of the credentials may not be provided to enterprise servers 354. After the credentials are created and stored on MNO servers 352, in one embodiment enterprise 310 can determine when and where credentials are provisioned via a credential control interface over connection 312 between enterprise servers 354 and MNO servers 352. Using a credential control interface, enterprise 310 may indicate which credentials should be provisioned or removed from a selected UE.

In embodiments for either direct and indirect control of subscription credentials, enterprise policies for use of provisioned credentials may be provided via connection 316 separately from profile provisioning.

In some embodiments, the credential device 358 may be a SIM card or removable eUICC which may be provided by MNO 320 or other manufacturer. Control of the credentials may then be provided to enterprise 310 by physically transferring the credential devices containing the credentials to enterprise 310. Enterprise 310 may then allocate a physical device to a user who may physically provision UE 356 by installing the credential device 358. Enterprise control over use of services may include enterprise servers 354 configured to determine usage policies on UE 356 via connection 316.

Further details are now described. The 3rd Generation Partnership Project (3GPP) has defined specifications for communications devices covering technologies such as Global System for Mobile Communications (GSM), Universal Mobile Telecommunications System (UMTS), and Long-Term Evolution (LTE). The 3rd Generation Partnership Project 2 (3GPP2) has defined other specifications including Code Division Multiple Access (CDMA). For communications devices complying with these 3GPP or 3GPP2 specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 320 may include both data and instructions. When the instructions are executed on a processor, such as the processor of credential device 358 within a mobile communications device 356, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

For example, the GSM Alliance (GSMA) has defined an architecture for remote provisioning of a communications device for subscription services without physically swapping SIM cards for machine-to-machine scenarios by using a eUICC. Some automobile telematics systems are examples of systems that use eUICC devices. While the use of a eUICC may enable limited subscription credential management without having to manage physical smart cards, the GSMA architecture does not enable third parties, such as an MNO's enterprise customers, to manage subscription credentials.

In some embodiments of this disclosure, subscription credentials, such as eUICC profiles, may be transferred electronically between devices as directed by a delegated entity, such as an enterprise customer of an MNO. For example, the MNO may delegate authority to an enterprise to determine where its subscriptions are to be allocated. In one embodiment, the enterprise may perform this allocation, while in another embodiment the MNO may maintain mechanisms for allocating profiles but allocate the profiles as requested by the enterprise. Profiles may be moved, for example, to reallocate a pool of subscriptions within a larger set of devices, or to swap subscriptions from different network providers to take advantage of roaming networks. An eUICC profile, as used herein, generally refers to the client information associated with a network subscription. Furthermore, embodiments of this disclosure are not limited to eUICC systems as defined by the GSMA.

In some embodiments, control and management of a communications device can be implemented in conjunction with management of eUICC profiles. For example, enterprise 310, MNO 320, and/or a device owner may control aspects of a communications device within a device management framework. The device management framework may be configured remotely with policies from network operators and enterprises. The device that is managed by the device management framework may utilize additional information, such as available networks or time of day, to inform local decisions regarding the use of multiple eUICC profiles. This additional information may be used for automatic enforcement of policies for the use of subscriptions on the device. The subscriptions may be for enterprise as well as personal subscriptions. Such policies may have been difficult or impossible to enforce in cases where subscriptions were changed through the swapping of physical cards. The device management framework may provide When enterprise 310 has configured policies for one or more of its subscriptions, enterprise 310 may employ the device management framework to implement enterprise control of a device when an associated profile is installed, activated, deactivated, or removed. In various embodiments, the device management framework may enable an enterprise to control devices that, for example, are configured to access enterprise data or connect to enterprise network resources. In one embodiment, a communications device may expose a collection of configurable settings that can be controlled by the enterprise 310 during a device management session with the device management framework. The device management session may include an interaction between a communications device and a trusted management entity through which the management entity configures the exposed settings and applies policies to the communications device. The configured settings may, for example, restrict the ability of the user to perform certain actions. For instance, enterprise 310 may require that a communications device be enrolled for device management in order to access corporate email. When a communications device is enrolled, a trust relationship may be established between the communications device and enterprise 310. By configuring device settings, such as a minimum password length to be entered by a user to unlock the device, enterprise 310 can control aspects of usage of the communications device. Such control can include, for example, how the communications device functions and limits as to the resources that the communications device is enabled to access.

In some embodiments, MNO 320 may maintain ownership and control of eUICC profiles during the lifecycles of the profiles, while enterprise 310 may exercise management control over the communications devices and their associated profiles. MNO 320 may own and control the content of eUICC profiles from their creation until the profiles are deleted. In one embodiment, a set of applications and files may be defined by profile templates and personalized when a profile is created. MNO 320 may update the contents of the profile when the profile is installed in a eUICC. The update mechanism may be specific to MNO 320. Credentials associated with the subscription (e.g., the security key K) may be stored securely in network access application(s) within the eUICC profile and in the MNO infrastructure. Access to the credential information may be maintained solely by MNO 320.

The device management framework may include mechanisms for configuring device management policies when a subscription is changed. For example, when a physical UICC has changed, or if a eUICC profile is installed, activated, deactivated, or removed, a procedure may be invoked to provision or configuration features and settings of the device. In one embodiment, the communications device may trigger a device management (DM) session when a change is detected. Furthermore, depending upon how the device was acquired, a personalization lock (aka "SIM lock") may be implemented that limits use of the device to subscriptions from a particular MNO. In some embodiments, MNO 320 may retain the ability to configure device management policies. The device management framework may thus include scenarios where the enterprise may be able to configure all device management policies, or where configuration control of aspects of the device management policies may be allocated between the enterprise and the MNO, or some combination thereof.

In some embodiments, the user or owner of a communications device may retain some controls over the device while the device is simultaneously being managed by enterprise 310 and/or MNO 320. For example, the user may be allowed to change the user's subscription using the eUICC-based solution such as the user would be able when in a manner similar to changing physical UICC cards. For example, when the device owner is also the end user (e.g., BYOD—bring your own device) the user may be enabled to switch between enterprise subscriptions and personal subscriptions on the communications device. For example, in the case of an enterprise-managed device, the user may be enabled to switch between a personal subscription and an enterprise subscription using an eUICC-based solution. The communications device may be configured to enforce policy restrictions on the use of enterprise resources (for example, the enterprise subscription may be restricted when the communications device enters a roaming state). However, the user may be allowed to use t user's own subscriptions under such conditions. In some embodiments, when a communications device is SIM-locked, the SIM-lock may be applied to all subscriptions, both enterprise and personal.

Figure 4:
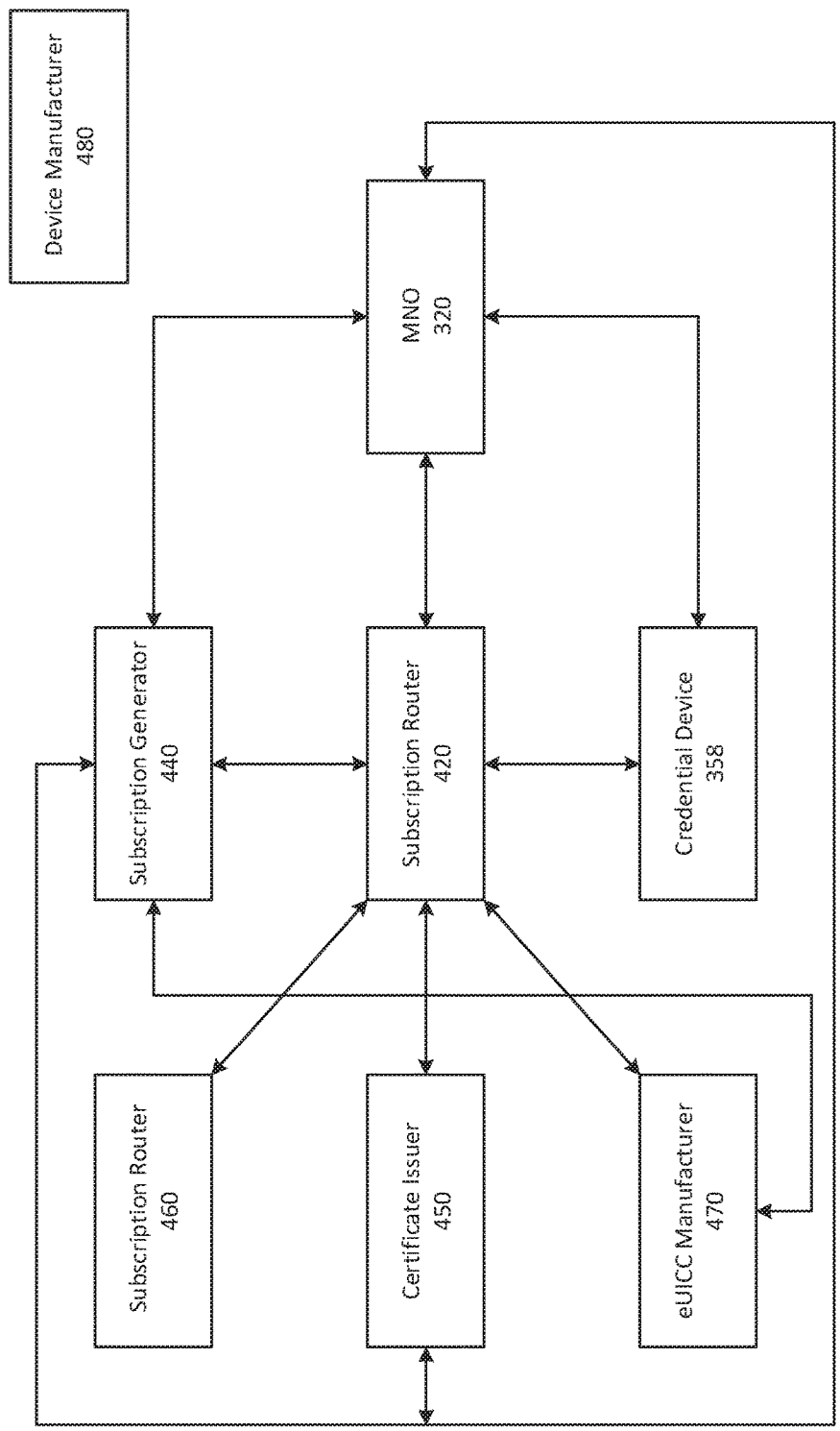
FIG. 4 depicts an example system for provisioning of profiles.

FIG. 4 depicts an example system for provisioning of eUICC profiles. In some embodiments, a mobile device manufacturer 480 may provide communications devices that incorporate a credential device 358. The eUICC manufacturer 270 typically provides the credential device 358 configured with an initial state. Referring to FIG. 4, an MNO 320, using one or more MNO servers 352, may provide network connectivity services and manage subscriptions profiles to access the connectivity services. MNO 320 may implement aspects of the device management framework, including a subscription router function 420 that may be configured to communicate securely to perform management of credential device 358. In some embodiments, the subscription router function 420 may incorporate aspects of the SM-SR and SM-SR+ functions defined by the GSMA. In one embodiment, ownership can be transferred securely to additional subscription routers 460. The subscription routers 420 and 460 may be configured to activate, deactivate, and delete profiles at the request of the MNO 320.

MNO 320 may also implement a subscription generator function 440 that may be configured to create profiles as directed by MNO 320 and arrange for the profiles to be provisioned onto the credential device 358 via the subscription router 420. In some embodiments, the subscription generator function 440 may incorporate aspects of the SM-DP function defined by the GSMA. The subscription generator 440 (via the subscription router 420) may be configured to activate, deactivate, and delete profiles on the credential device 358 at the request of MNO 320. A Certificate Issuer (CI) 450 may issue certificates and act as a trusted third party for authentication between entities of the system. For example, the certificates can be used to secure communications between the subscription router 420 and the corresponding security domain on the credential device 358 (which may also be referred to as the ISD-R) and between the subscription generator 440 and its corresponding instance of a secure container on eUICC 530 (which may also be referred to as ISD-P).

Figure 5:
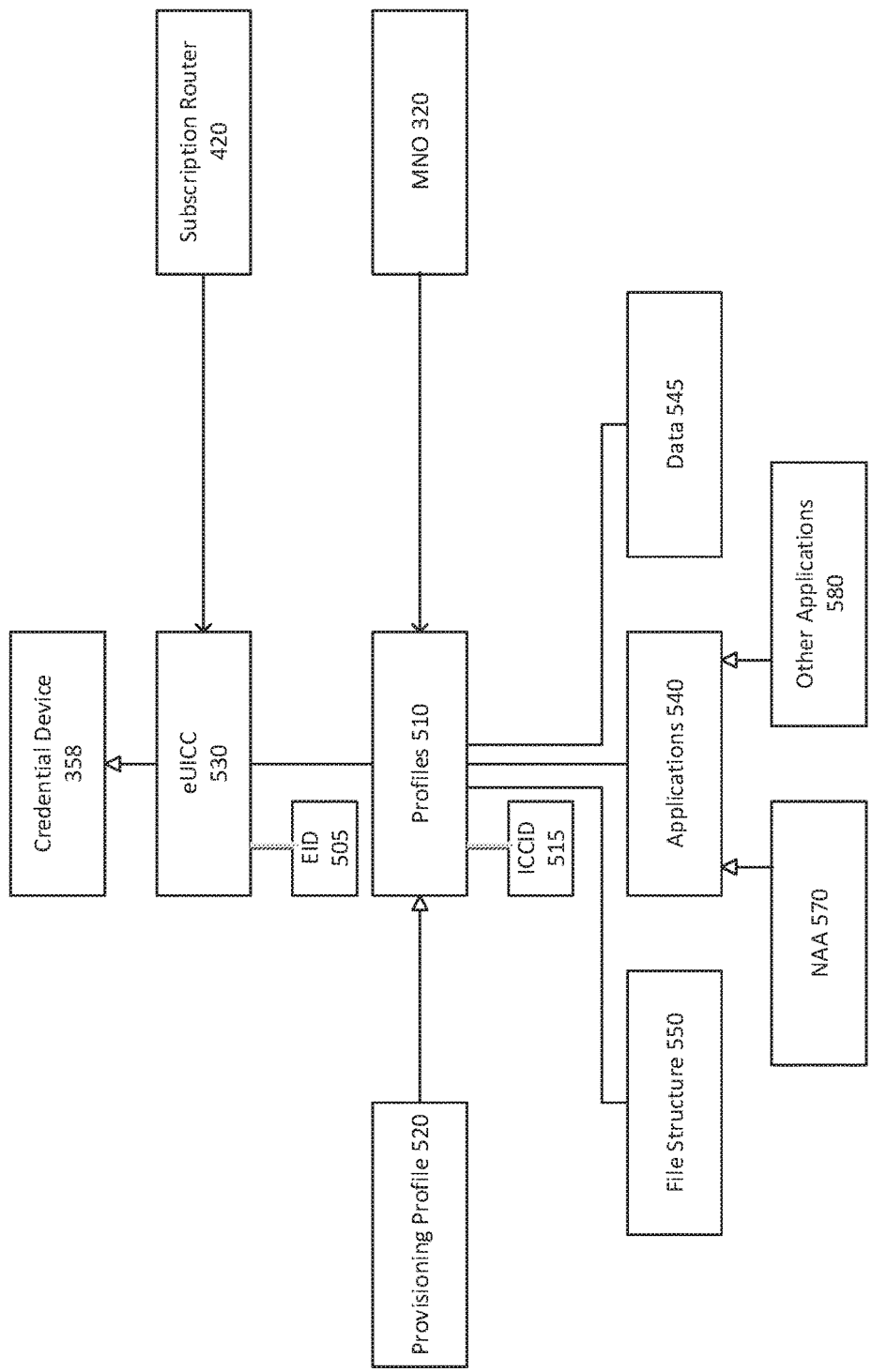
FIG. 5 depicts an example logical structure for a credential device.

FIG. 5 depicts an example logical structure for a credential device 358 that may include a eUICC 530 containing multiple profiles 510. Each profile may have a globally unique identifier referred to as ICCID 515. In some embodiments, eUICC 530 may be identified by a globally unique value referred to as the eUICC-ID or EID 505.

A credential device 358 may be implemented by an eUICC 530, which may be one embodiment of the credential device 358 of FIG. 3. A physical UICC may be another embodiment. As depicted in FIG. 5, the subscription router 420 may communicate with the credential device 358 (such as eUICC 530).

At least one of the profiles 510 contained in the eUICC 530 may be used to provide connectivity to the subscription router 420 for profile management. This profile may be designated as a provisioning profile 520.

In some embodiments, the operating system of the credential device 358 (e.g., eUICC 530) may be compliant to the GLOBALPLATFORM specifications for management of multiple applications on secure chip technology (e.g., MULTOS and JavaCard). Such a compliant operating system may host a set of applications within different security domains. The profiles 510 and may contain one or more applications 540. The applications 540 may include network access applications (NAAs) that provide authorization to access a network (such as the Universal Subscriber Identity Module (USIM) for 3GPP, CDMA Subscriber Identity Module (CSIM) for 3GPP2, or IP Multimedia Service Subscriber Identity Module (ISIM) for LTE and others) and other applications. The USIM and CSIM NAAs represent a subscription to the MNO 320 and may contain information such as the subscriber identifier (e.g., International Mobile Subscriber Identifier, or IMSI) and one or more phone numbers. NAAs may also contain a key K for authentication and ciphering purposes. K may be secured and not directly exposed outside of the credential device 358. Typically, K may be known only to the profile and the MNO that owns the profile or created the profile.

The enabled profile 510 on the credential device 358—including the file system, set of applications, network authentication and interaction, card application toolkit, etc.—may be functionally equivalent to a stand-alone legacy UICC card that may typically provide the provisioning profile and where the issuance MNO may control some management of the UICC card. Therefore, the eUICC 530 may not require network changes for connectivity functions such as network registration, voice calling, text messaging, packet data service, etc.

Figure 6:
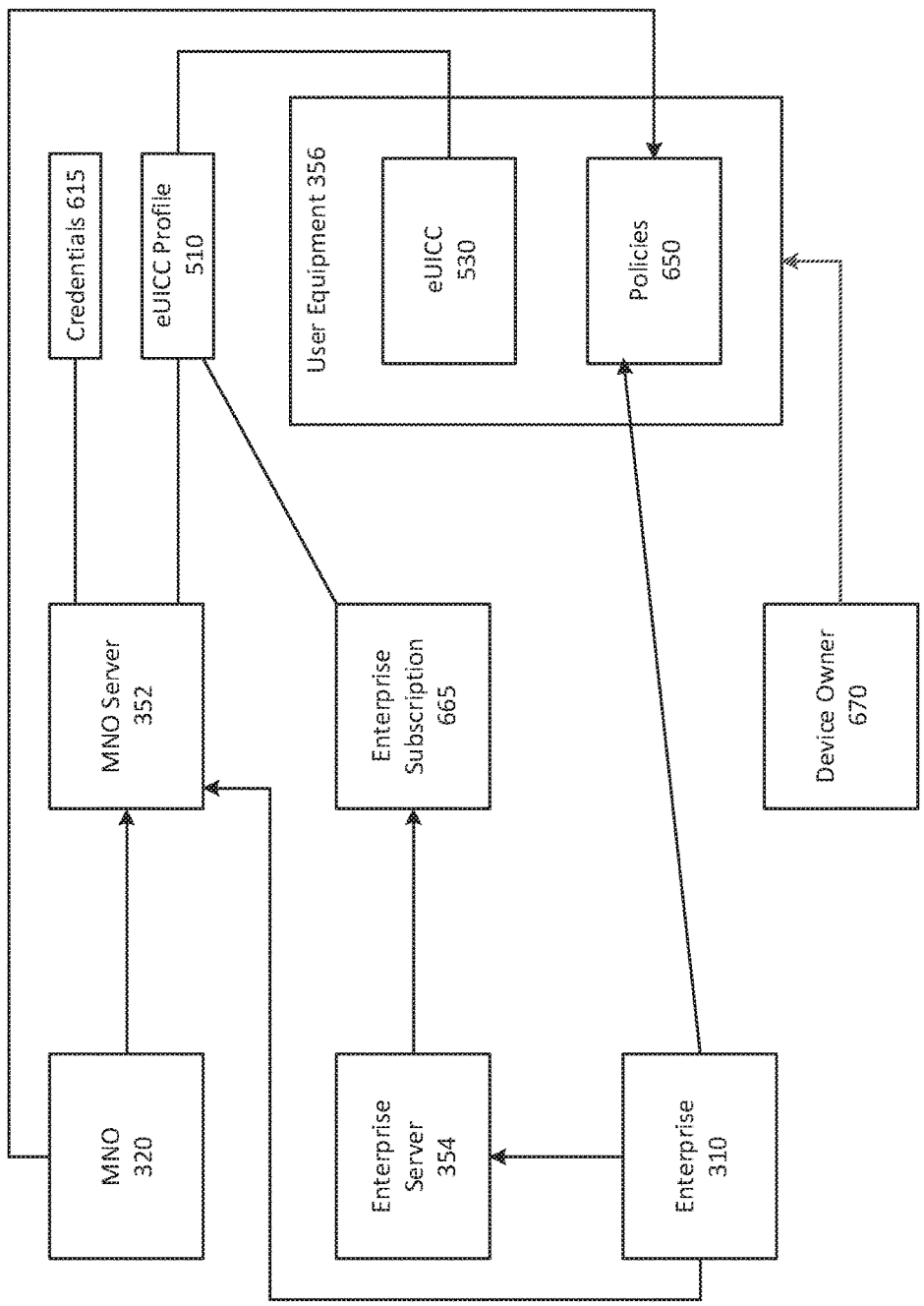
FIG. 6 depicts an example system for enterprise servers.

FIG. 6 depicts an example system for enterprise management of profiles as described herein. MNO 320 may provide connectivity services that MNO 320 may manage through a set of subscriptions managed by MNO server 352. In some embodiments, the MNO subscriptions may include a set of services, policies, and billing rules as well as associated states. The subscriptions may include a unique identity and a set of credentials 615 that can be used to access the subscriptions 610 and that are known to the MNO 320 and the user equipment (UE) 356. The credentials 615 may be securely stored by an authentication center within the infrastructure of MNO 320. Typically, the credentials 615 may be encapsulated with a set of related information for a network access application (NAA) within eUICC profile 510. At any given time, at most one UE 356 may contain the client credentials. The MNO 320 may own and manage the contents of eUICC profile 510 throughout its lifecycle, and may own and manage other policies on UE 356 with which UE 356 is currently associated.

Enterprise 310, as shown in FIG. 6, may acquire a fleet of subscriptions from MNO 320 for distribution to its workforce. Enterprise 310 may be responsible for payment for services as the services are used. Enterprise 310 may also define policies 650 that are to be applied when its enterprise subscriptions are used. An Enterprise Management Platform (EMP) (not shown) may be implemented on enterprise server 354 that may implement at least some of the functionality of the device management framework described above. The EMP may be configured to provide account and device management services for enterprise subscriptions 665. MNO 320 may delegate direct management of enterprise subscriptions 665 to the EMP implemented on enterprise server 354. For the subscriptions 665 delegated to the EMP implemented on enterprise server 354, the EMP may not manage the content of eUICC profiles 510 and may manage the assignment of the eUICC profiles 510 to devices as well as associated enterprise policies 650.

In one embodiment, enterprise 310 may act as its own management provider. In another embodiment, the management provider may be a separate entity, which may, for example, be the MNO 320 or a third party. In some cases, enterprise 310 may manage its profiles directly (e.g., through the deployment manager described further below). Alternatively, enterprise 310 may manage its profiles indirectly, where the management may be performed, for example, by a third-party service or by the MNO itself, operating at the enterprise's request).

UE 356, as shown in FIG. 6, may be associated with a device owner 670. Enterprise 310 may also own enterprise-provided UEs 356 and allocate them to its workforce. Alternatively, UEs 356 may be owned by individual users. The device owner 670 may establish some of the policies pertaining to its use.

An end user may be a member of the enterprise workforce that uses MNO services via UE 356 according to one or more subscriptions 665 managed by enterprise 310. In the case of a UE 356 owned by the end user, the end user may have one or more personal subscriptions which the end user may have separately obtained from MNO 320. The end user may be able to select whether to use a personal subscription or an enterprise subscription on UE 356, and may be subject to one or more enterprise policy constraints.

The mobile operator typically owns the content of the eUICC profile and may update the eUICC profile at any time, as the mobile operator may also update the profile in a physical UICC. The profile state may change while installed in a device, either due to remote operator management or local activity. Local activity may include, for example, user updates to the phone book, short message service (SMS) store for text messages, personal identification number (PIN) state, etc. Because the profile state may change while resident in the eUICC, enterprise 310 may retrieve the profile state and securely store its modified state for subsequent re-installation. The external representation of the profile, such as a representation outside the eUICC device, can be opaque to enterprise 310 in that enterprise 310 may install and retrieve profiles while MNO 320 typically maintains ownership of the content of the profile.

Enterprise 310 may re-assign a subscription from a first user to a second user after enterprise 310 has retrieved a subscription initially assigned to the first user. In the case of a physical UICC, the card may be transferred to the new owner. However, the card may no longer be in the same state as it was when it was initially assigned. For example, the MNO may have updated the profile, or the usage on the previous device may have resulted in changes elements of the profile's state. Before reassigning the card, enterprise 310 may reset the profile state by erasing the phonebook, SMS store, call history, etc. and resetting a PIN to a known value and unlocked state using a personal unlocking key (PUK). Re-assignment of subscriptions may be enabled by enterprise device management of a profile reset policy (e.g., value of PIN1, PUK1, etc.) and by a device agent configured to reset the profile state according to the policy.

In implementations using eUICCs, a secure external representation of the current profile state may be provided. Enterprise 310 may install and activate a reassigned profile on a new communications device. As configured by enterprise policy, a local agent on the communications device may be configured to reset the profile state (phonebook, SMS store, PIN1, etc.). As in the case of a physical UICC, these operations may be performed using an existing UICC interface defined by ETSI, for example.

When an enterprise user is using a communications device in a remote area, cellular service may be provided by a different MNO than the one associated with the current subscription (e.g., roaming). For roaming access, the enterprise may update the communications device that is in use, for example by providing additional assets to the communications device (such as additional subscriptions) or by updating policies (e.g., policies that define how the set of subscriptions is used).

Enterprise 310 may also choose to configure a policy on the communications device to prevent the communications device from roaming, in which case the communications device may be forced to rely upon other methods of connectivity such as WiFi. Alternatively, enterprise 310 can provide the enterprise user with an additional subscription for the roaming mobile operator. In the case of physical UICCs, enterprise 310 can provide the user with a set of UICCs, and the user can choose an appropriate UICC card when the user is aware of the need for roaming based upon t user's current location or from indications from the user interface of the communications device.

Enterprise 310 may also provision multiple profiles on a eUICC. The profiles may, for example, be associated with subscriptions from different mobile operators. The enterprise 310 may also provision policies regarding conditions under which the subscriptions are to be used. An agent executing on the device, as further detailed below, may enumerate the profiles on the communications device, evaluate the enterprise policy rules, and enable the correct profile based on current circumstances (e.g., location, time of day, network availability, etc.). Changes in these conditions may trigger the agent to re-evaluate the policy and enable a different profile. Compared to the use of physical UICCs, the enterprise 310 may be able to retain greater control over the usage of its subscriptions, while the user need not manage multiple physical cards. Embodiments of the roaming access scenario may further be enabled by local profile management (enumeration, enable/disable) on the communications device.

In some embodiments, a communications device may be allowed to switch accounts based upon one or more enterprise policies. The communications device may enforce enterprise policies regarding subscription use. For example, the user may be allowed to instruct the communications device to display available profiles and select a new profile to activate. The device may evaluate enterprise policies for the selected profile, if any, and may allow or reject the user request. If the selected profile is allowed, the communications device may instruct the eUICC to switch to that profile. The communications device may trigger a device management session to the mobile operator based upon the new profile. Likewise, according to the enterprise policies, the communications device may initiate an enterprise device management session based upon the new profile. The ability of the user to switch subscriptions on the communications device may be enabled by enterprise management, enterprise policies for profile selection, and by local profile management.

Certain enterprise resources may be accessible only with an enterprise subscription. Conversely, some non-enterprise resources may be accessible only with a personal subscription. As noted above, more than one enterprise subscription may be available to the communications device for various conditions such as roaming conditions. In the case of physical UICCs, the enterprise can configure some policies to the communications device (e.g., install certain firewall rules or prevent roaming). In this case, the user may swap to a different UICC card to avoid a loss of service. When eUICCs are used, the communications device may switch to an appropriate profile based upon enterprise policies, and in some cases subject to user consent. For some conditions (such as selection of a home/roaming subscription) the user may choose to grant one-time consent. For other conditions (such as switching subscriptions to access a protected resource), consent may be granted for each instance. This scenario may be enabled by management and enterprise policies for profile selection and by local profile management.

In some embodiments, enterprise 310 may maintain a device record so that enterprise 310 may disable or delete selected functions or content on a communications device. For example, enterprise 310 may issue a remote wipe of enterprise information from the communications device. In addition, enterprise 310 may configure a policy on the communications device to wipe all enterprise information if security conditions are not satisfied (for instance, in response to multiple failed password attempts). The communications device may be configured to enumerate the installed eUICC profiles and locally delete selected or all enterprise profiles, or perform a master clear of the entire eUICC.

Figure 7:
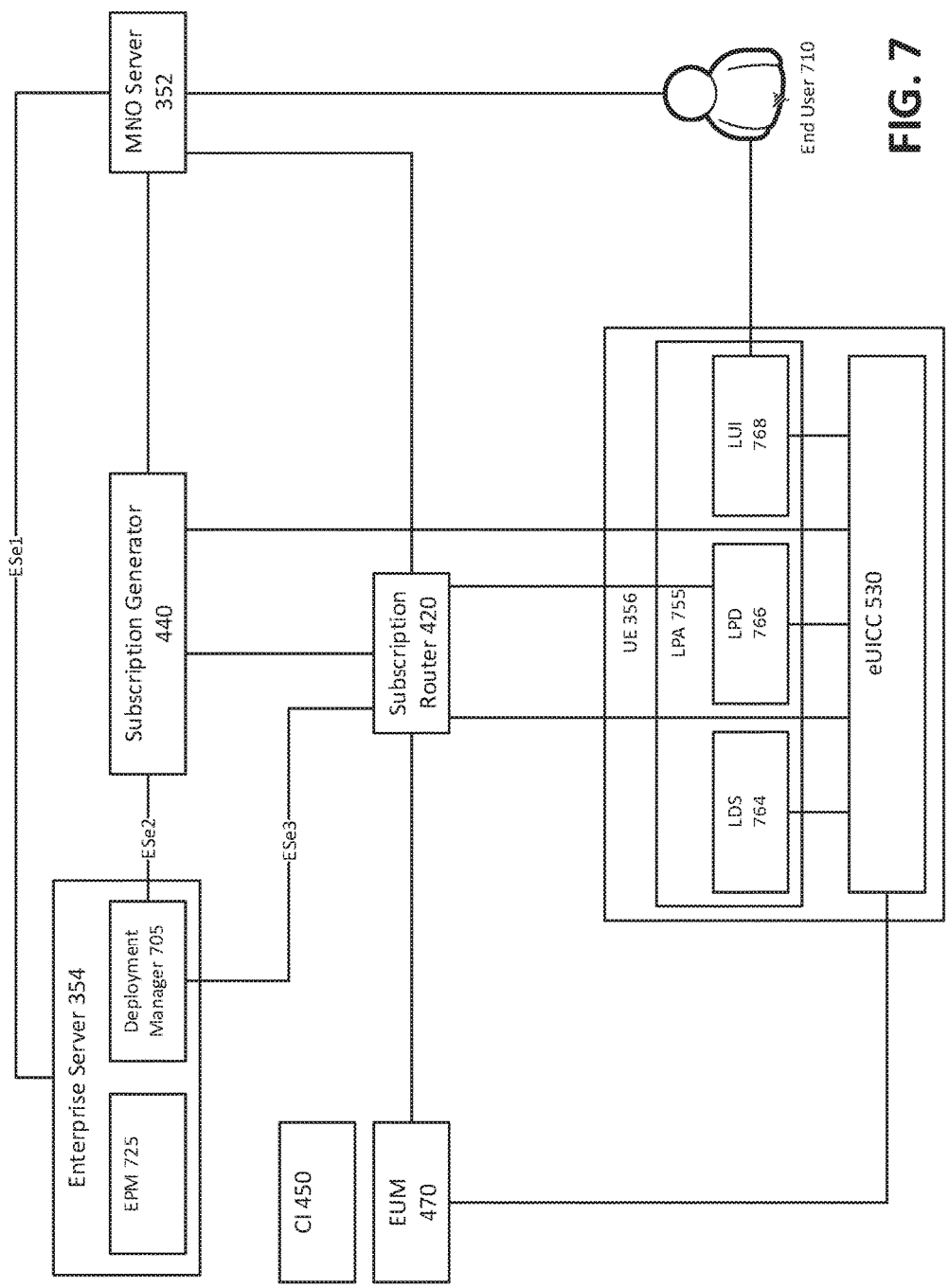
FIG. 7 depicts an example system for delegated management of subscription credentials.

FIG. 7 depicts an example system for delegated management of subscription credentials. The example depicted in FIG. 7 illustrates delegation of one or more mobile operator profile management functions to an enterprise for management of its own subscriptions. Referring to FIG. 7, in one embodiment the subscription generator 440 may be implemented on a server and may be configured to create eUICC profiles, for example as depicted in FIG. 5. Subscription generator 440 may also be configured to control installation of the profiles on a eUICC 530, control removal of the profiles from eUICC 530, and activate and deactivate profiles that are resident on eUICC 530.

In one embodiment, subscription router 420 may be implemented on a server and may be configured to provide secure communication with eUICC 530, cache profiles to be delivered to eUICC 530, and activate/deactivate profiles resident on eUICC 530. Profiles on eUICC 530 associated with MNO 320 may be managed by MNO 320 using subscription generator 440 and subscription router 420. In some embodiments, subscription generator 440 may be associated with MNO 320, while subscription router 420 may be associated with the eUICC Manufacturer (EUM 270). In some embodiments, subscription router 420 and subscription generator 440 may be implemented in a single server. Subscription generator 440 may be configured to assist UE 356 and its eUICC 530 in locating subscription router 420 or other subscription routers that manage eUICC 530.

As discussed, an enterprise may manage a fleet of service subscriptions provided by MNO 320. The enterprise server 354 may implement functionality of the enterprise policy manager 725 and deployment manager 705, which may be configured to obtain profiles for enterprise subscriptions from subscription generator 440, cache the profiles locally until they are installed, and deploy the profiles and retrieve the profiles to/from eUICC 530 via the subscription router 420. In some embodiments, the functionality of deployment manager 705 may incorporate aspects of the SM-DM function defined by the GSMA. The ESe1 interface, which in some embodiments may correspond to interface 312 in FIG. 3, may connect enterprise server 354 and MNO 320 for subscription purchase, payment, and cancellation. The ESe2 interface may enable enterprise-owned profile packages created by subscription generator 440 to be delegated to deployment manager 705. In one embodiment, delegation from subscription generator 440 to deployment manager 705 may include providing a copy of the created profile to deployment manager 705. In other embodiments, control of delivery, retrieval, activation and deactivation of profiles to eUICC 530 on UE 356 may be provided. Deployment manager 705 may be configured to deploy and retrieve profiles to managed devices over the ESe3 interface.

An enterprise policy manager (EPM) 725 (which may also be referred to as a mobile device manager (MDM)) may be configured for management of enterprise UE 356, depicted in FIG. 7. EPM 725 may be used to manage enterprise policies in conjunction with provisioned profiles. In one embodiment, EPM 725 may be configured to manage a target UE 356 using, for example, DM, and querying and updating values that are organized into a hierarchical namespace (e.g., a tree). In some examples, the layout of the hierarchical namespace defined by OMA may be described with specific sub-trees defined by implementers. However, it should be understood that such namespaces definitions are example implementations and that other definitions are also contemplated. The installation, removal, and switching of profiles may be performed using other methodologies by EPM 725. Alternatively, the installation, removal, and switching of profiles may be accomplished by deployment manager 705 using protocols and interfaces similar to those used by subscription generator 440. The installation, removal, and switching of profiles may be accomplished by requesting MNO 320 to perform this action on the enterprise's behalf using the MNO's subscription generator 440.

Within UE 356, a local policy agent (LPA) 755 may be configured to assist in eUICC profile management with a local discovery service (LDS) 764, a local profile download (LPD) 766, and a local user interface (LUI) 768. The LDS 764 may be configured to discover the subscription router used to provision the eUICC. The LPD 766 may be configured to assist in downloading large profile objects in applicable sizes. The LUI 768 may be configured to interact with the device end-user for local operations such as user-initiated profile switching.

Figure 8:
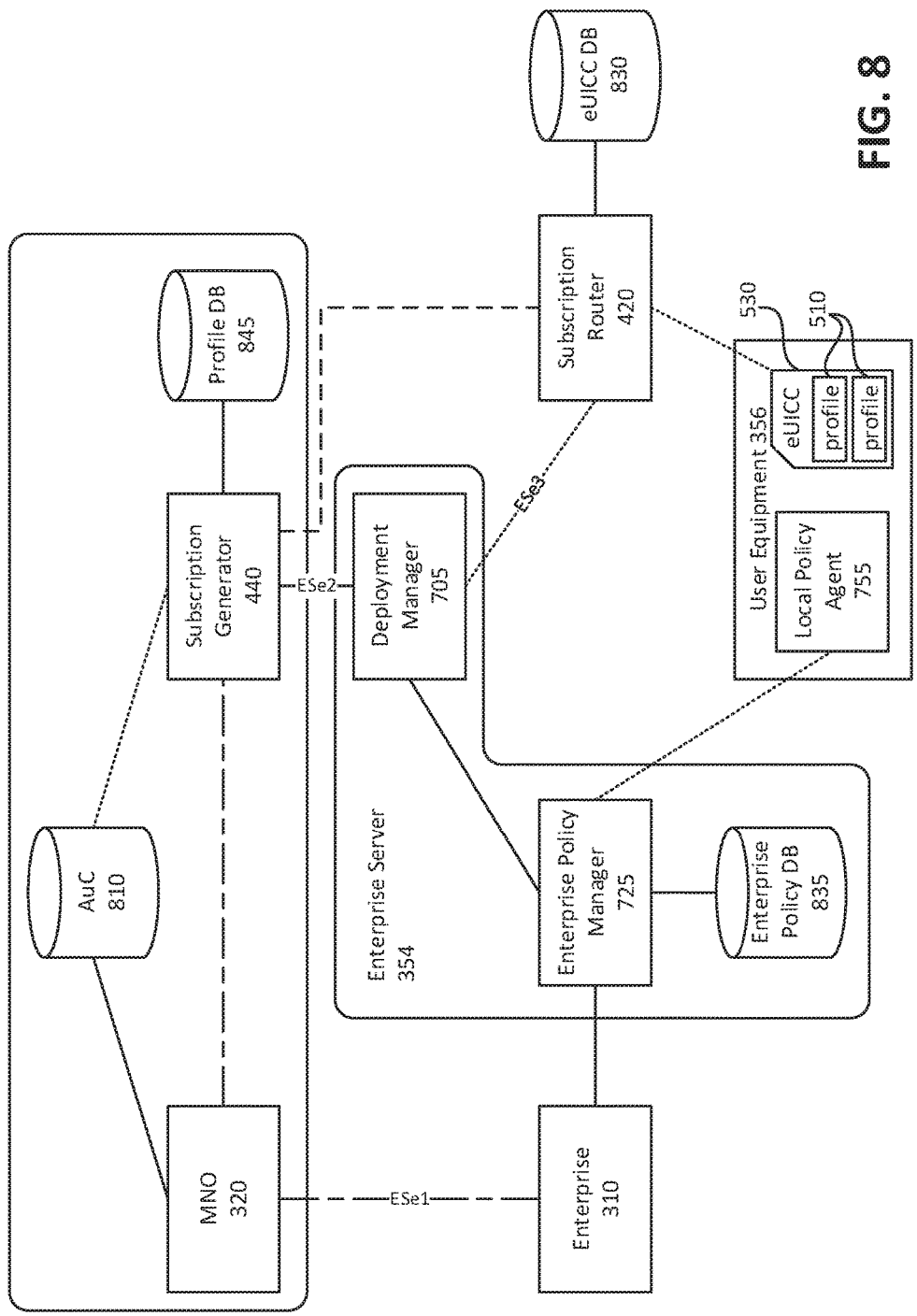
FIG. 8 depicts an example system for delegated profile management.

FIG. 8 depicts an example system for delegated profile management in which enterprise policies and direct control of the profiles are provided by the enterprise server 354, including database relationships. In an embodiment, AuC 810 may be an authentication center and may reside with the Home Location Register (HLR) in the MNO infrastructure. Subscription router 420 may be configured to access eUICC DB 830. DB 830 may comprise a local inventory of installed profiles on the eUICCs that it manages. In an embodiment, subscription router 420 may be a pass-through for profiles from subscription generator 440 to the eUICC 530, or in some embodiments, the subscription router 420 may also store profiles for eUICC 530 until the profiles are delivered to their final destination. In some embodiments, enterprise 310 may use an interface to MNO 320 to manage its profiles rather than managing them directly with deployment manager 705.

Figure 9:
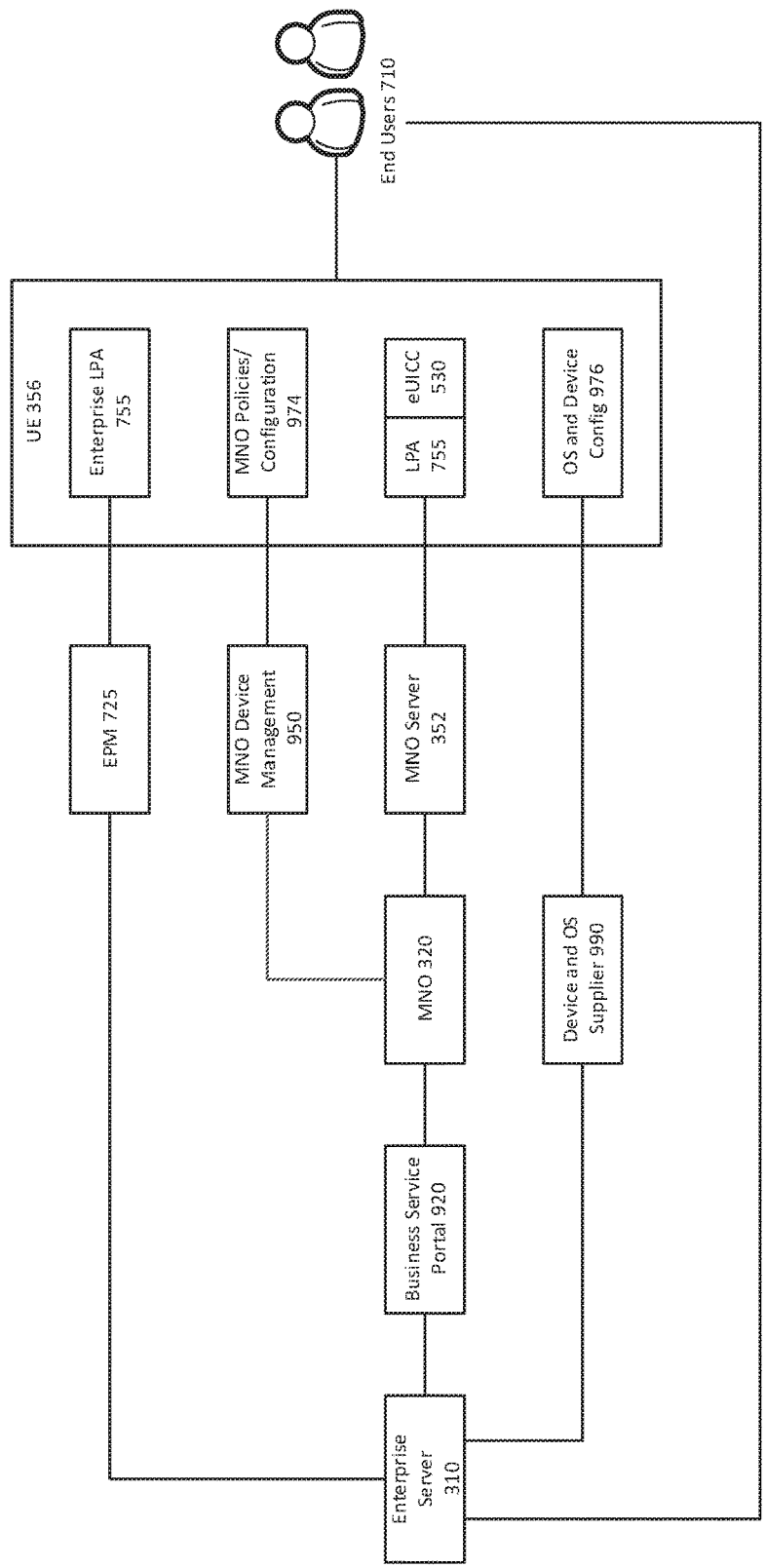
FIG. 9 depicts an example system for managing a subscription.

FIG. 9 depicts an example system for managing subscriptions via an interface. In FIG. 9, the relationships between various components in an enterprise ecosystem are depicted where enterprise 310 manages its subscriptions through the use of an MNO interface (which may be referred to as a business service portal 920) rather than directly via deployment manager 705.

In the example of FIG. 9, enterprise 310 is shown as having a relationship with a plurality of end users 710. End users 710 may be associated with one or more devices UE 356. For example, an end user may have personal devices as well as an enterprise-provided device. Likewise, UE 356 may have a relationship with a plurality of end users 710 (e.g., a computer may have accounts for multiple users). Enterprise 310 may employ the associated enterprise policy manager 725 (e.g., device management system MDM) that configures its settings/policies on a plurality of devices. Enterprise 310 may establish a relationship with a plurality of device/OS suppliers 990 (e.g., Dell, Acer, Microsoft), who may in turn have relationships with a plurality of enterprises. The device/OS supplier 990 may configure its software and settings on a plurality of devices. This configuration may be implemented via Windows Update, an OEM-specific update mechanism, or some other update mechanism.

Enterprise server 310 may also be configured to communicate with one or more MNOs 320 through business service portal 920. Business service portal 920 may be configured to allow an enterprise to select, purchase, cancel, and/or interact with subscriptions from MNO 320. In an embodiment, MNO 320 may include a device management system 950 that can configure settings/policies on a plurality of devices. MNO 320 may also implement a device management protocol, for example OMA DM or OMA Client Provisioning (CP). MNO 320 may further implement a subscription management system implemented on MNO server 352 (e.g., subscription generator 440 and subscription router 420 that configures the eUICC 530 on a plurality of devices). The subscription management system implemented on MNO server 352 may be configured to communicate directly with eUICC 530 or communicate via the local policy assistant (LPA) 755 on UE 356. eUICC 530 may have a plurality of relationships with the MNO server 352. For example, eUICC 530 may be provisioned by multiple MNOs, each with its own subscription generator/subscription router. In this embodiment, the enterprise may provide its own MNO server 352 and business service portal 920 interface. Alternatively, these functions may be provided by an enterprise management provider. The enterprise management provider may be a MNO or a third party.

In some embodiments, the system depicted in FIG. 8 may be configured to allow for secure packaging of subscription credentials with delegated management. In an embodiment, one of more of the illustrated components may be configured to allow a service provider (e.g., MNO 320) to control or own the content of eUICC profiles (including configuration information, keys, and other information confidential to the service provider), while an enterprise may control deployment and provisioning of the profiles to eUICCs without having access to a profile's internal contents.

Referring to FIG. 8, subscription router 420 may be configured to provide secure connectivity to the eUICC and perform profile management operations such as installation, deletion, and profile switching. The subscription generator 440 may be configured to create eUICC profiles for a mobile operator and provision the profiles to the eUICC through the subscription router 440. A security relationship may be configured between the eUICC 530 and subscription router 420, between the eUICC 530 and subscription generator 440, and between the subscription router 420 and subscription generator 440.

In a remote provisioning scenario, subscription router 420 may store profiles until they are provisioned to the eUICC 530. The eUICC 530 may have a trust relationship with more than one subscription router 420; likewise, multiple subscription generators 440 may share the same subscription router 420.

Subscription generator 440 may be configured to create enterprise eUICC profiles and delegate the profiles to deployment manager 705. Deployment manager 705 may be configured to communicate with the subscription router 420 to install and remove the profiles from eUICC 530 installed on UE 356. A security association between these elements may be defined. For example, a trust relationship may be defined between subscription generator 440 and subscription router 420, between subscription generator 440 and deployment manager 705, between the deployment manager 705 and subscription router 420, and between the subscription router 420 and eUICC 530.

In various embodiments, secure packaging of a eUICC profile at-rest between its creation at the subscription generator 440 and its delivery to the eUICC 530 may be defined. Secure packaging of a eUICC profile at-rest may enable MNO 320 to trust enterprise-managed deployment manager 705 with at-rest storage of eUICCs.

Embodiments of a system with securely packaged eUICC profiles may include the following elements. Subscription generator 440 may have its own signing certificate with a chain back to a trusted root such as the certificate issuer CI 150. Subscription router 420 may have a signing certificate associated with each subscription generator 440 and signed by each subscription generator 440.

The external representation of a profile may be encrypted using a public/private key pair. Symmetric encryption may be used with a session key encrypted with the public/private key. The entities that encrypt the profile, such as subscription generator 440 and subscription router 420, may access the public key. Only the entity that decrypts the profile, such as subscription router 420, may access the private key. Deployment manager 705 may verify that the signature of the profile is from the subscription generator 440 or subscription router 420, but may be prevented from examining its contents because the external representation of each profile (the profile at rest) may be encrypted by the public key.

In some embodiments, a process for profile creation and delegation may include subscription generator 440 receiving a request to create a new profile for a specific mobile operator and specific subscription router 420 and to delegate the profile to an enterprise's deployment manager 705. When subscription router 420 is co-located with subscription generator 440, this operation may be completed as requested. Alternatively, the profile may be supplied to subscription generator 440 along with the request to create the new profile. Subscription generator 440 may send a request to subscription router 420 to create a public/private key pair for a specific profile identifier. Subscription router 420 may create the key pair and securely store the key pair in a local database keyed by the profile identifier. Subscription router 420 may send the public key to subscription generator 440. Subscription generator 440 may then create an external representation of the eUICC profile, encrypt the eUICC profile using the public key, and sign the encrypted eUICC profile with its own certificate. The subscription generator 440 may deliver the encrypted profile to deployment manager 705 along with the identity and certificate of subscription router 420. The deployment manager 705 may verify that the signature of the profile matches subscription generator 440. Deployment manager 705 may place profile metadata (including its certificate) into a long-term database. Finally, deployment manager 705 may store the profile until deployment manager 705 is ready to provision the profile to eUICC 530.

In some embodiments, a process for profile provisioning to eUICC 530 may include the following operations. Deployment manager 705 may receive a request from enterprise server 354 to provision a profile in its database to eUICC 530. Deployment manager 705 may retrieve the stored encrypted profile. Deployment manager 705 may securely transmit the profile to the subscription router 420 along with information regarding the eUICC 530 to be provisioned. Deployment manager 705 may delete its local copy of the profile and update the profile metadata to include eUICC 530 for the profile. The subscription router 420 may verify that the signature attached to the profile matches the signature for subscription generator 440 or for itself. Subscription router 420 may verify that it recognizes the identity of the profile. The subscription router 420 may begin a provisioning session with eUICC 530. Subscription router 420 may then decrypt the profile using the private key. Subscription router 420 may de-serialize the external representation and securely transmit the profile to eUICC 530.

In some cases, states within a profile may change while the profile is resident on eUICC 530. It may thus not be sufficient for deployment manager 705 or subscription router 420 to retain the encrypted copy for later use. In some embodiments, when a profile is removed from a device, the profile's current state may be retrieved. In one embodiment, the retrieval of the profile's current state can be completed with the following operations. Deployment manager 705 may receive a request from an enterprise server to remove a profile from a specified eUICC. Deployment manager 705 may retrieve information for subscription router 420 from the profile metadata and request subscription router 420 to retrieve the profile. Subscription router 420 may begin a provisioning session with eUICC 530. Subscription router 420 may retrieve the current state of the profile, and subscription router 420 may delete the profile from eUICC 530. Subscription router 420 may encrypt the current profile using the public key for the profile and sign the encrypted profile with its own certificate. Subscription router 420 may then send the encrypted profile to deployment manager 705, which may verify the signature of the profile. Deployment manager 705 may verify the identity of the profile and store the encrypted profile. Deployment manager 705 may update the metadata for the profile in its database to indicate that it holds the profile data and that there is no current eUICC.

Figure 10:
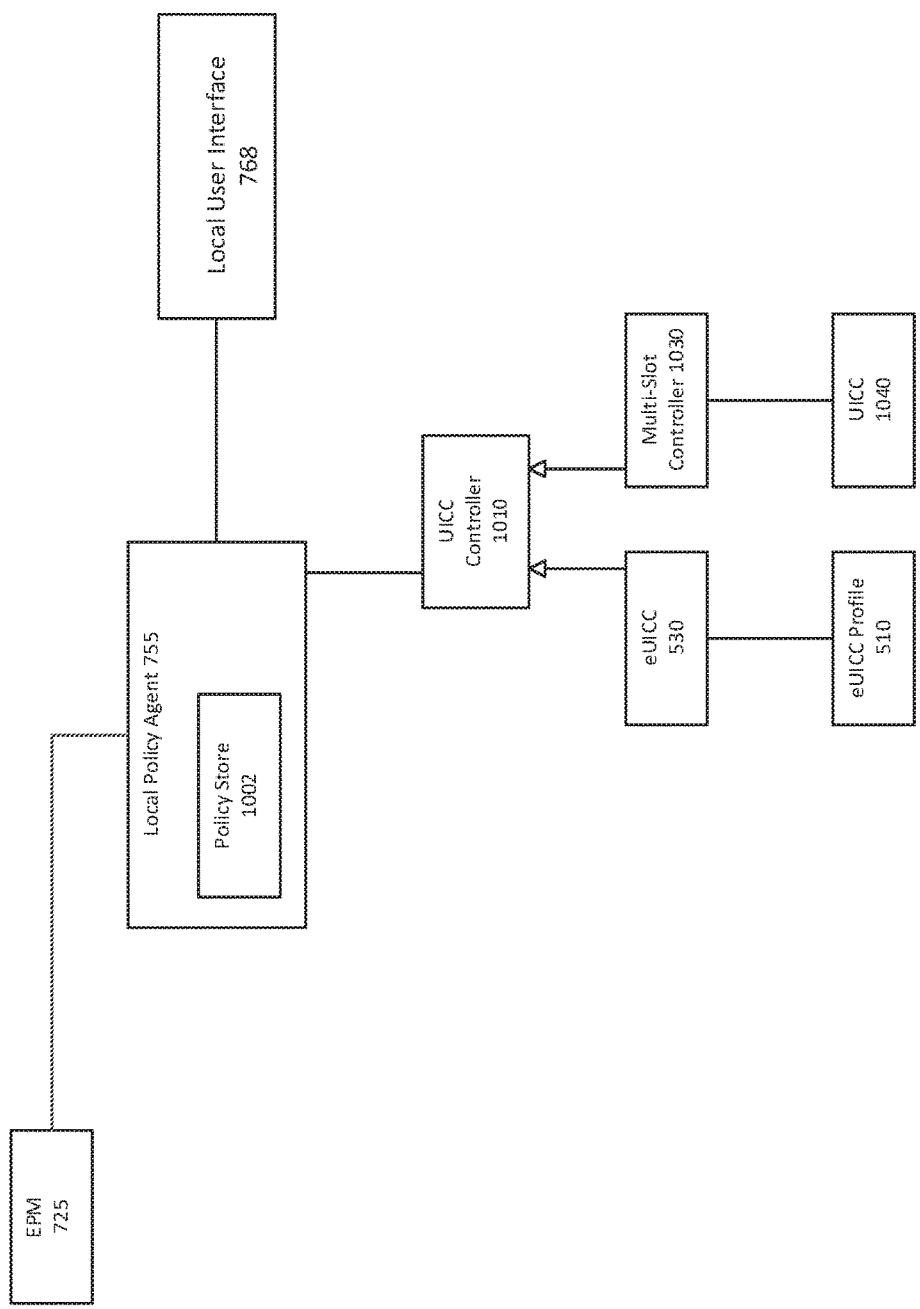
FIG. 10 depicts an example system for policy-based subscription credential selection.

FIG. 10 depicts an example system for policy-based subscription credential selection. In one embodiment, the example system of FIG. 10 includes local policy agent 755 on the user equipment device that is configured to select between multiple subscriptions based upon current device conditions, user input, policies established by the user, device owner, and mobile operator, and other information. The actions of the local policy agent 755 may be remotely configurable by an enterprise policy manager 725. The local policy agent 755 may also referred be to as a local subscription manager.

In some embodiments, local policy agent 755 may be configured to operate as an event-driven component. Local policy agent 755 may contain, for example, a rules engine driven by a set of policy rules located in a policy store 1002. Policy store 1002 may be implemented in a database, file, registry, etc. Local policy agent 755 may further receive device state input from a modem (for example on WINDOWS, via the mobile broadband interface) and/or from various other components in the operating system.

UICC controller 1010 may be configured to execute a subscription selection function. In the case of a dual-slot device or multi-modem device, UICC controller 1010 may enable cellular data on the selected card and disable cellular data on the other cards, for example. UICC controller 1010 in this case may restrict the user from manually overriding this selection. In the case of a eUICC, in one embodiment the UICC controller 1010 may be implemented by enabling the selected eUICC Profile 510 on the eUICC 530. In this case, UICC controller 1010 may communicate securely with eUICC 530 to enumerate its available profiles 510 and to switch between profiles.

Local user interface 768 may include a control panel or other interface by which the device end user can request a change in the active subscription (for example, by selecting a desired subscription). Local policy agent 755 may be configured to evaluate the request according to an applicable policy and implement the request or reject the request according to the applicable policy.

In some embodiments, changes in a profile state may be confirmed via user consent. For example, local policy agent 755 may confirm changes to the profile state when using the local user interface 768. In one embodiment, the user may grant a blanket consent at the time the device is enrolled for enterprise device management so that user interaction is not required for every change. The user may grant such a consent for enterprise profiles. In the case of an enterprise-owned device, the user may grant the consent implicitly as part of a broader agreement pertaining to the use of the enterprise-owned asset.

In one embodiment, local policy agent 755 may expose hierarchical namespaces representing rulesets for the enterprise and mobile operator, which in some examples may be implemented as a DM tree. Local policy agent 755 may also provide a configuration interface for namespaces (e.g., a DM configuration service provider plugin) that may be used in conjunction with the device management client on the device. A remote management system that implements the DM protocol and is configured to interact with the policy namespace may be allowed to manage the device, such as, for example, enterprise policy management 725 of FIG. 7.

Figure 11:
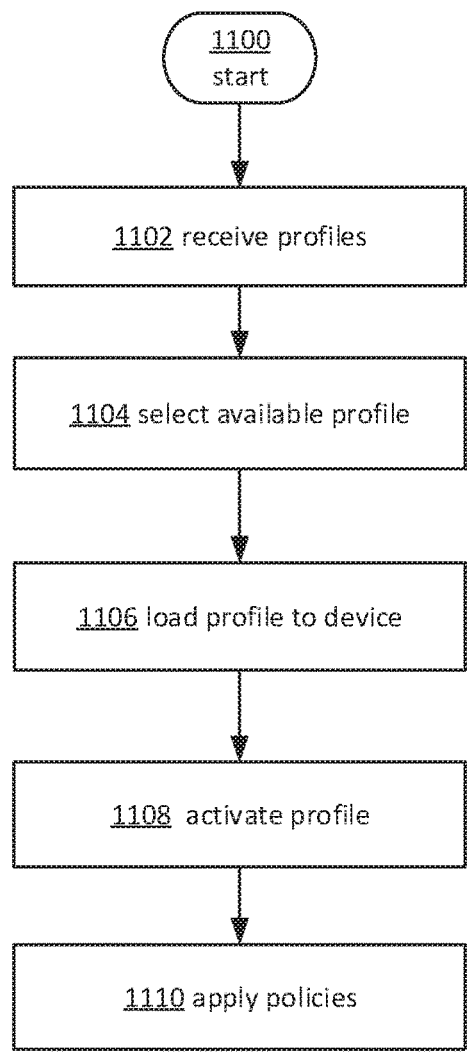
FIG. 11 depicts an operational procedure for delegated management of subscription credentials.

FIG. 11 illustrates an example operational procedure for provisioning of profiles in accordance with this disclosure. In an embodiment, the operational procedure may be implemented in a system comprising one or more computing devices. The computing devices may have memories that have stored thereon computer-executable instructions that, when executed, cause the system to perform operations as described. Referring to FIG. 11, operation 1100 begins the operational procedure. Operation 1100 may be followed by operation 1102. Operation 1102 illustrates receiving one or more service subscriptions. For example, MNO 320 may delegate subscriptions and provide the subscriptions to enterprise server 354, which may store the profiles locally until they are deployed and activated. In other embodiments, subscription credentials may be generated and stored on mobile network operator servers and enterprise server 354 may determine which devices are to be provisioned.

Operation 1102 may be followed by operation 1104. Operation 1104 illustrates selecting an available profile for allocation to an enterprise device. For example, a profile 510 may be selected for allocation to a UE 356 with credential device 358. Operation 1104 may be followed by operation 1106. Operation 1106 illustrates sending the profile to the enterprise device. For example, profile 510 may be installed on the UE 356, including software, policies, and other configuration information. Operation 1106 may be followed by operation 1108. Operation 1108 illustrates activating the profile. Operation 1108 may be followed by operation 1110. Operation 1110 illustrates applying one or more policies for the profile. For example, the enterprise 310 may apply specific policy rules regarding the ability of UE 356 to connect to enterprise resources.

Figure 12:
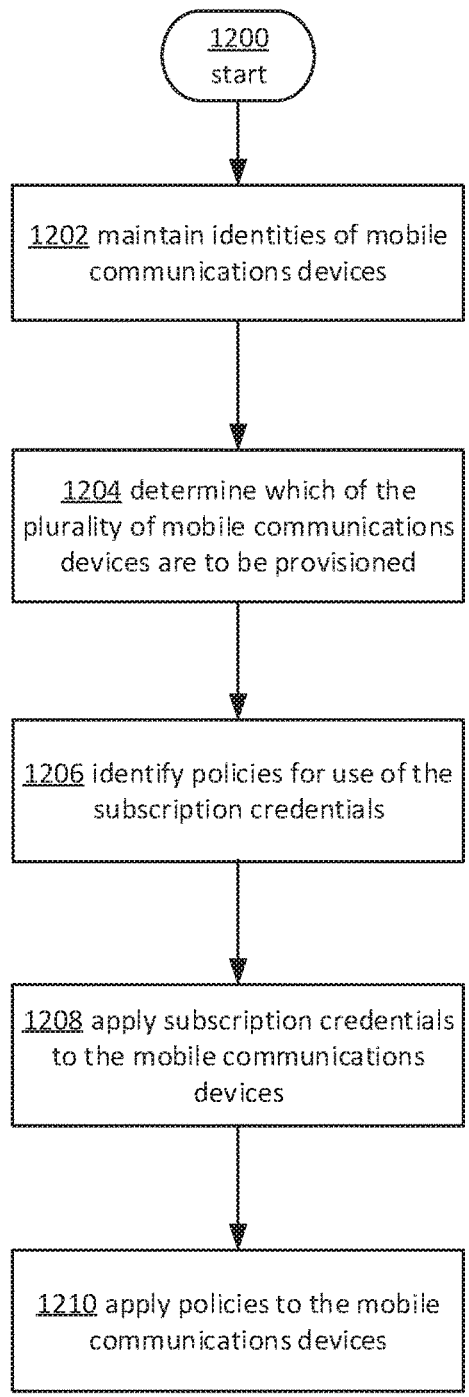
FIG. 12 depicts an operational procedure for management of delegated subscription credentials and related policies

FIG. 12 illustrates an example of an operational procedure for managing a plurality of mobile communications devices by an enterprise operating an enterprise server. The mobile communications devices may be configured to communicate on a mobile communications network operated by a mobile network operator. In one embodiment, the operational procedure may be implemented in a system comprising a memory storing thereon instructions that when executed by a processor of the system, cause the system to perform the operations. Referring to FIG. 12, the operational procedure may include operations 1202, 1204, 1206, and 1208. Operation 1200 begins the operational procedure. Operation 1200 may be followed by operation 1202. Operation 1202 illustrates maintaining, by the enterprise server, identities of a plurality of mobile communications devices. Operation 1202 may be followed by operation 1204. Operation 1204 illustrates determining, by the enterprise server, which of the plurality of mobile communications devices are to be provisioned by the subscription credentials. The subscription credentials may be operative to enable access to subscription services of the mobile network operator by the plurality of mobile communications devices via the mobile communications network. In one embodiment, control of the subscription credentials are delegated from the mobile network operator to the enterprise server In one example, control of the subscription credentials may include selection, by the enterprise server, of which of the mobile communications devices are to be assigned subscriptions. The selected mobile communications devices may receive, from the mobile network operator, the subscription credentials. In another example, control of the subscription credentials may include selection, by the enterprise server, of the subscription credentials and receiving, from the mobile network operator by the enterprise server, the subscription credentials. In another example, the control of the subscription credentials may comprise allowing the enterprise server to create credentials on mobile network operator servers and sending the credentials from the mobile network operator servers to the enterprise server. Furthermore, a selected mobile communications device may be provisioned by sending a selected profile from the enterprise server to a credential device of the selected mobile communications device.

Operation 1204 may be followed by operation 1206. Operation 1206 illustrates identifying, by the enterprise server for the determined mobile communications devices, policies for use of the subscription credentials by the determined mobile communications devices. In some embodiments, the subscription credentials may be associated with subscriptions from a plurality of mobile network operators and the policies may comprise conditions under which the subscriptions are to be activated. In some embodiments, the policies may include policies for activation of alternate provisioned profiles associated with other mobile network operators. The profiles may be activated, for example, based on a condition or service.

Operation 1206 may be followed by operation 1208. Operation 1208 illustrates applying one or more of the subscription credentials to the determined mobile communications devices. Operation 1208 may be followed by operation 1210. Operation 1210 illustrates applying, by the enterprise server, one or more of the policies to the determined mobile communications devices. In some embodiments, the policies may be enforced at least in part by a device agent executing on the mobile communications devices. Additionally, the policies may be enforced at least in part by a credential device configured to interact with the device agent to enforce the policies.

Figure 13:
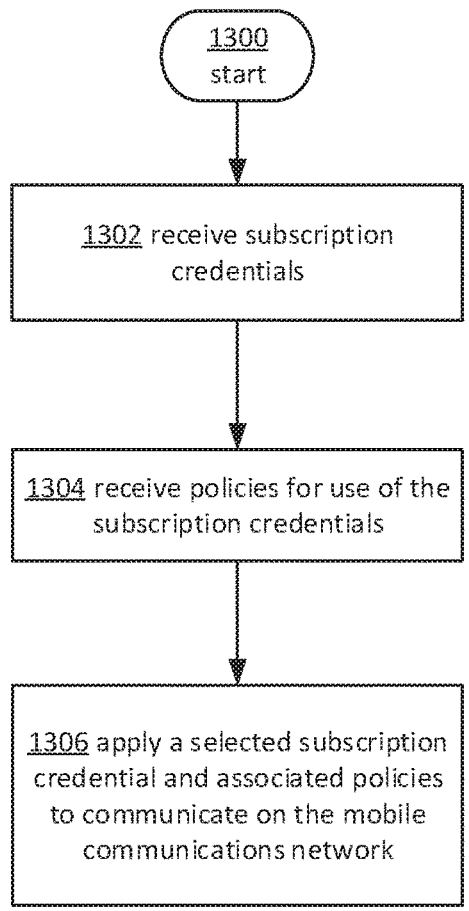
FIG. 13 depicts an operational procedure for management of delegated subscription credentials and related policies.

FIG. 13 illustrates an example of an operational procedure for communicating, by a mobile communications device, on a mobile communications network operated by a mobile network operator. In one embodiment, the operational procedure may be implemented in a device comprising a memory storing thereon instructions that when executed by a processor of the device, cause the device to perform the operations. Referring to FIG. 13, the operational procedure may include operations 1302, 1304, and 1306. Operation 1300 begins the operational procedure. Operation 1300 may be followed by operation 1302. Operation 1302 illustrates receiving one or more subscription credentials that are operative to enable access to subscription services of the mobile network operator via the mobile communications network. In an embodiment, control of the subscription credentials may be delegated from the mobile network operator to the enterprise server. In one embodiment, the mobile communications device may receive the subscription credentials from an enterprise server. In another embodiment, the mobile communications device may receive the subscription credentials from the mobile network operator. In this embodiment, the enterprise server may determine the assignment of the credentials through a credential control interface. In one embodiment, determination of the assignment of the credentials may be implemented via an interface between the enterprise server 310 and the business service portal 920 as shown on FIG. 9.

Operation 1302 may be followed by operation 1304. Operation 1304 illustrates receiving, from the enterprise server, one or more policies for use of the one or more subscription credentials.

Operation 1304 may be followed by operation 1306. Operation 1306 illustrates applying a selected subscription credential and associated ones of the policies to communicate on the mobile communications network.

In some embodiments, the mobile communications device may be further configured to select and apply the subscription credentials and policies based at least in part on local device information. The local device information may include, for example, available networks, time of day, location, a selected user profile, or a combination thereof. Other local device information may also be considered.

In some embodiments, the mobile communications device may be further configured to expose an interface comprising one or more configurable settings that can be controlled during a device management session. The device management session may be implemented in conjunction with a device management framework. In one embodiment, the device management session may include an interaction between the mobile communications device and a trusted management entity through which the management entity configures the exposed settings and applies policies to the mobile communications device.

In some embodiments, the mobile communications device may be further configured to allow a user to select a personal subscription or an enterprise subscription enabled by the received subscription credential and the policies. In one embodiment, the mobile communications device may be further configured to allow local user control while being managed by the enterprise server. The mobile communications device may be configured to enforce policy restrictions on the use of enterprise resources. The user of the mobile communications device may be allowed to use the user's own subscriptions under some conditions. For example, the user may be allowed to instruct the communications device to display available profiles and select a new profile to activate.

Figure 14:
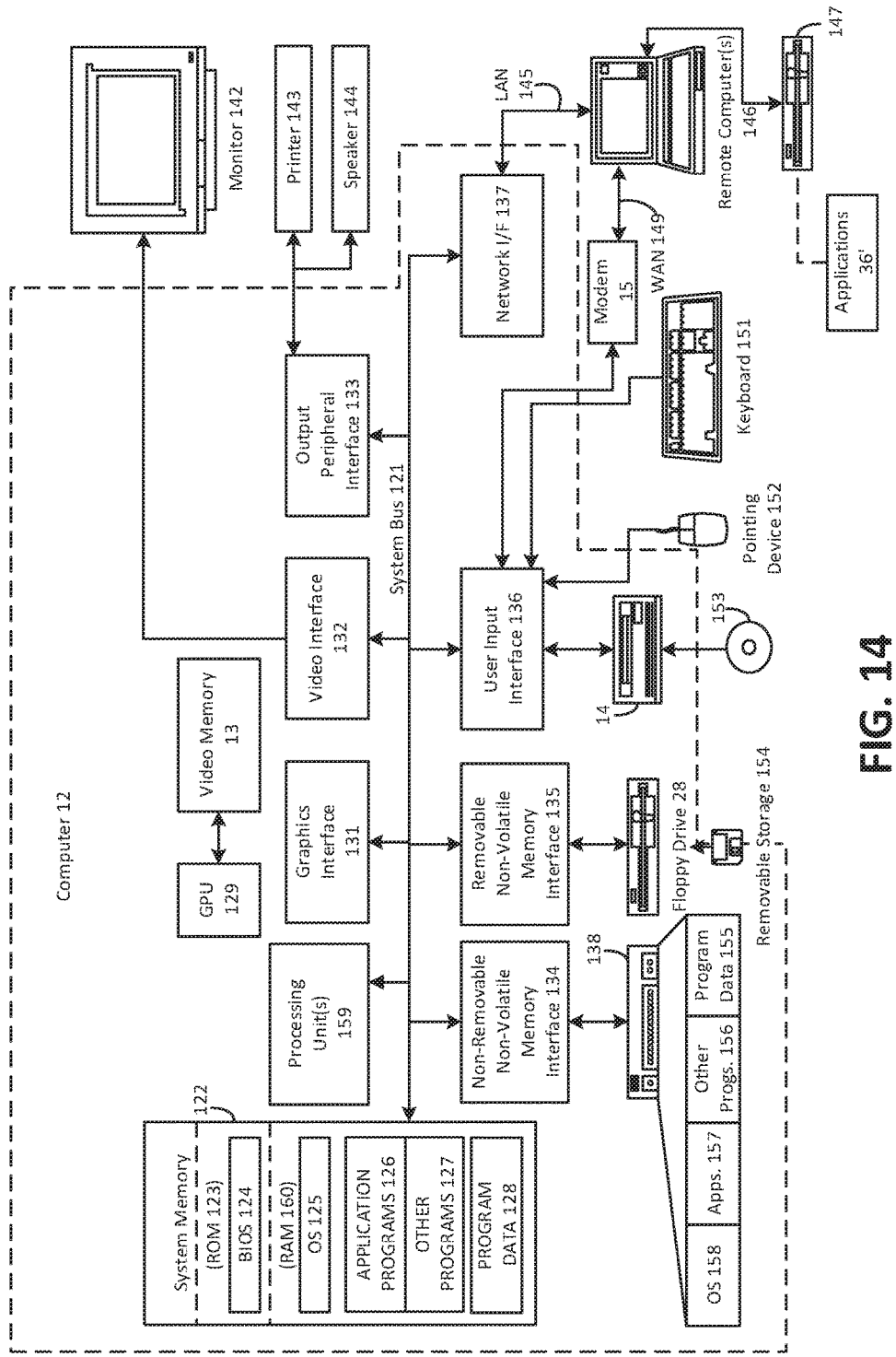
FIG. 14 depicts an example general purpose computing environment in which in which the techniques described herein may be embodied.

FIG. 14 depicts an example general purpose computing environment in which in which some of the techniques described herein may be embodied. The computing system environment 12 is only one example of a suitable computing environment and is not intended to suggest any limitation as to the scope of use or functionality of the presently disclosed subject matter. Neither should the computing environment 12 be interpreted as having any dependency or requirement relating to any one or combination of components illustrated in the example operating environment 12. In some embodiments the various depicted computing elements may include circuitry configured to instantiate specific aspects of the present disclosure. For example, the term circuitry used in the disclosure can include specialized hardware components configured to perform function(s) by firmware or switches.

In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 141 typically includes a variety of computer-readable media. Computer-readable media can be any available media that can be accessed by computer 141 and includes both volatile and nonvolatile media, removable and non-removable media. The system memory 122 includes computer-readable storage media in the form of volatile and/or nonvolatile memory such as read only memory (ROM) 123 and random access memory (RAM) 160. A basic input/output system 124 (BIOS), containing the basic routines that help to transfer information between elements within computer 141, such as during start-up, is typically stored in ROM 123. RAM 160 typically contains data and/or program modules that are immediately accessible to and/or presently being operated on by processing unit 159. By way of example, and not limitation, FIG. 14 illustrates operating system 125, application programs 126, other program modules 127, and program data 128.

The computer 141 may also include other removable/non-removable, volatile/nonvolatile computer storage media. By way of example only, FIG. 14 illustrates a hard disk drive 138 that reads from or writes to non-removable, nonvolatile magnetic media, a magnetic disk drive 139 that reads from or writes to a removable, nonvolatile magnetic disk 154, and an optical disk drive 14 that reads from or writes to a removable, nonvolatile optical disk 153 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 138 is typically connected to the system bus 121 through an non-removable memory interface such as interface 134, and magnetic disk drive 139 and optical disk drive 14 are typically connected to the system bus 121 by a removable memory interface, such as interface 135.

The drives and their associated computer storage media discussed above and illustrated in FIG. 14, provide storage of computer-readable instructions, data structures, program modules and other data for the computer 141. In FIG. 14, for example, hard disk drive 138 is illustrated as storing operating system 158, application programs 157, other program modules 156, and program data 155. Note that these components can either be the same as or different from operating system 125, application programs 126, other program modules 127, and program data 128. Operating system 158, application programs 157, other program modules 156, and program data 155 are given different numbers here to illustrate that, at a minimum, they are different copies. A user may enter commands and information into the computer 141 through input devices such as a keyboard 151 and pointing device 152, commonly referred to as a mouse, trackball or touch pad. Other input devices (not shown) may include a microphone, joystick, game pad, satellite dish, scanner, or the like. These and other input devices are often connected to the processing unit 159 through a user input interface 136 that is coupled to the system bus, but may be connected by other interface and bus structures, such as a parallel port, game port or a universal serial bus (USB). A monitor 142 or other type of display device is also connected to the system bus 121 via an interface, such as a video interface 132. In addition to the monitor, computers may also include other peripheral output devices such as speakers 144 and printer 143, which may be connected through a output peripheral interface 133.

The computer 141 may operate in a networked environment using logical connections to one or more remote computers, such as a remote computer 146. The remote computer 146 may be a personal computer, a server, a router, a network PC, a peer device or other common network node, and typically includes many or all of the elements described above relative to the computer 141, although only a memory storage device 147 has been illustrated in FIG. 14. The logical connections depicted in FIG. 14 include a local area network (LAN) 145 and a wide area network (WAN) 149, but may also include other networks. Such networking environments are commonplace in offices, enterprise-wide computer networks, intranets and the Internet.

When used in a LAN networking environment, the computer 141 is connected to the LAN 145 through a network interface or adapter 137. When used in a WAN networking environment, the computer 141 typically includes a modem 15 or other means for establishing communications over the WAN 149, such as the Internet. The modem 15, which may be internal or external, may be connected to the system bus 121 via the user input interface 136, or other appropriate mechanism. In a networked environment, program modules depicted relative to the computer 141, or portions thereof, may be stored in the remote memory storage device. By way of example, and not limitation, FIG. 14 illustrates remote application programs 148 as residing on memory device 147. It will be appreciated that the network connections shown are example and other means of establishing a communications link between the computers may be used.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for controlling a plurality of mobile communications devices by an enterprise operating an enterprise server, the mobile communications devices configured to communicate on a mobile communications network operated by a mobile network operator, the method comprising:
    maintaining, by the enterprise server, identities of a plurality of mobile communications devices;
    determining, by the enterprise server, which of the plurality of mobile communications devices are to be provisioned by subscription credentials that are operative to enable access to subscription services of the mobile network operator by the plurality of mobile communications devices via the mobile communications network, wherein control of the subscription credentials is delegated from the mobile network operator to the enterprise server;
    for the determined mobile communications devices, identifying, by the enterprise server, policies for use of the subscription credentials by the determined mobile communications devices;
    applying one or more of the subscription credentials to the determined mobile communications devices; and
    applying, by the enterprise server, one or more of the policies to the determined mobile communications devices.

2. The method of claim 1, wherein the policies are enforced at least in part by a device agent executing on the mobile communications devices.

3. The method of claim 2, wherein the policies are further enforced at least in part by a credential device configured to interact with the device agent to enforce the policies.

4. The method of claim 1, wherein the policies include policies for activation of alternate provisioned profiles associated with other mobile network operators.

5. The method of claim 1, wherein the subscription credentials are associated with subscriptions from a plurality of mobile network operators and the policies comprise conditions under which the subscriptions are to be activated.

6. The method of claim 1, wherein:
    said control of the subscription credentials comprises allowing the enterprise server to create credentials on mobile network operator servers and sending the credentials from the mobile network operator servers to the enterprise server; and
    a selected mobile communications device is provisioned by sending selected credentials from the enterprise server to a credential device of the selected mobile communications device.

7. The method of claim 1, wherein:
    the subscription credentials are generated on mobile network operator servers; and
    a selected mobile communications device is provisioned by sending selected subscription credentials from the mobile network operator servers to a credential device of the selected mobile communications device.

8. The method of claim 1, wherein said control of the subscription credentials includes selection, by the enterprise server, of the subscription credentials and receiving, from the mobile network operator by the enterprise server, the subscription credentials.

9. A method performed by a computing device comprising storage hardware, processing hardware, and a network interface, the computing device configured to communicate on a mobile communications network operated by a mobile network operator, the method comprising:
    receiving, via the network interface, one or more subscription credentials that are operative to enable access to subscription services of the mobile network operator via the mobile communications network, and storing the subscription credentials in the storage hardware;
    receiving, via the network interface, from an enterprise server, one or more policies for use of the one or more subscription credentials, and storing the one or more policies in the storage hardware, wherein control of the subscription credentials is delegated from the mobile network operator to the enterprise server; and
    applying, by the processing hardware, a selected subscription credential and associated ones of the policies to communicate on the mobile communications network.

10. A method according to claim 9, further comprising selecting and applying the subscription credentials and policies based at least in part on local device information.

11. A method according to claim 10, wherein the local device information comprises one or more of available networks, time of day, location, and a selected user profile.

12. A method according to claim 9, further comprising exposing an interface comprising one or more configurable settings that can be controlled during a device management session.

13. A method according to claim 9, further comprising allowing a user to select a personal subscription or an enterprise subscription enabled by the received subscription credential and the one or more of the policies.

14. A method according to claim 9, further comprising executing an agent operable to manage a plurality of profiles on the mobile communications device and enable one of the profiles based on the policies and local information.

15. A method according to claim 14, further comprising providing a rules engine for implementing the policies.

16. A method according to claim 14, further comprising receiving, by the agent, a request to change an active subscription and evaluate the request according to an applicable policy.

17. A system configured to manage a plurality of mobile communications devices, the mobile communications devices configured to communicate on a mobile communications network operated by a mobile network operator, the system comprising:
    a memory storing thereon instructions that when executed by a processor of the system, cause the system to:
        maintain identities of a plurality of mobile communications devices;
        determine which of the plurality of mobile communications devices are to be provisioned by the subscription credentials that are operative to enable access to subscription services of the mobile network operator by the plurality of mobile communications devices via the mobile communications network, wherein control of the subscription credentials is delegated from the mobile network operator;
        for the determined mobile communications devices, identify policies for use of the subscription credentials by the determined mobile communications devices;
    cause application of one or more of the subscription credentials to the determined mobile communications devices; and
    apply one or more of the policies to the determined mobile communications devices.

18. The system of claim 17, wherein said control of the subscription credentials comprises creation of credentials.

19. The system of claim 17, wherein said control of the subscription credentials includes selection of subscription credentials and receiving the selected subscription credentials.

20. The system of claim 17, further comprising instructions that when executed by the processor of the system, cause the system to select one or more configurable settings during a device management session with the determined mobile communications devices.

* * * * *